US005998008A

United States Patent [19]

Shimamura et al.

[11] Patent Number: 5,998,008

[45] Date of Patent: Dec. 7, 1999

[54] DEVELOPER CARRYING MEMBER, COMPRISING A COAT LAYER CONTAINING A CONDUCTIVE PARTICLE AND A NITROGEN-CONTAINING HETEROCYCLIC COMPOUND DEVELOPING APPARATUS, DEVELOPING METHOD, IMAGE FORMING APPARATUS, AND PROCESS CARTRIDGE

[75] Inventors: Masayoshi Shimamura; Yasuhide Goseki; Kenji Fujishima, all of Yokohama; Michiko Orihara, Tokyo; Kazunori Saiki, Yokohama; Satoshi Otake, Numazu, all of Japan

[73] Assignee: Canon Kabushiki Kaisha, Tokyo, Japan

[21] Appl. No.: 08/864,977

[22] Filed: May 28, 1997

[30] Foreign Application Priority Data

May 29, 1996 [JP] Japan .................................... 8-156358
Feb. 19, 1997 [JP] Japan .................................... 9-034189

[51] Int. Cl.$^6$ .............................. B32B 5/12; G03G 15/06

[52] U.S. Cl. .......................... 428/323; 428/325; 428/327; 428/403; 399/222; 399/262; 399/319; 399/327; 399/342; 399/343; 399/346; 430/14; 430/18; 430/35; 430/48; 430/69; 430/73; 430/76; 430/79

[58] Field of Search .................................... 428/323, 403, 428/327, 325; 430/9, 14, 18, 35, 48, 59, 69, 73, 76, 79; 399/222, 262, 319, 327, 342, 343, 346

[56] References Cited

U.S. PATENT DOCUMENTS 4,299,894 11/1981 Klose et al. ................................ 430/9
4,587,699 5/1986 Kadomatsu et al. ................... 29/121.1
4,707,382 11/1987 Tajima et al. ............................ 427/58
4,860,417 8/1989 Tajima et al. ............................ 29/130
4,871,638 10/1989 Kato et al. ............................... 430/96
5,034,300 7/1991 Anno et al. ............................ 430/120
5,266,433 11/1993 Ishida et al. ........................... 430/110
5,340,677 8/1994 Baba et al. .......................... 430/106.6
5,427,884 6/1995 Ohtani et al. .......................... 430/110
5,500,046 3/1996 Hagiwara et al. ...................... 118/653
5,534,981 7/1996 Ohno et al. ............................ 355/245
5,802,428 9/1998 Ohno et al. ............................ 399/222

FOREIGN PATENT DOCUMENTS 0339944 11/1989 European Pat. Off. .
0421331 4/1991 European Pat. Off. .
0461672 12/1991 European Pat. Off. .
0594366 4/1994 European Pat. Off. .
2-176762 7/1990 Japan .
3-200986 9/1991 Japan .

*Primary Examiner*—Hoa T. Le
*Attorney, Agent, or Firm*—Fitzpatrick, Cella, Harper & Scinto

[57] ABSTRACT

A developer carrying member is comprised of a substrate and a coat layer which covers the surface of the substrate. The coat layer contains at least a binder resin, conductive spherical particles having a number average particle diameter of from 0.3 $\mu$m to 30 $\mu$m and a true density of 3 g/cm$^3$ or below, and a nitrogen-containing heterocyclic compound, the particles and the compound being dispersed in the binder resin.

63 Claims, 4 Drawing Sheets

DEVELOPER CARRYING MEMBER, COMPRISING A COAT LAYER CONTAINING A CONDUCTIVE PARTICLE AND A NITROGEN-CONTAINING HETEROCYCLIC COMPOUND DEVELOPING APPARATUS, DEVELOPING METHOD, IMAGE FORMING APPARATUS, AND PROCESS CARTRIDGE

BACKGROUND OF THE INVENTION

1. Field of the Invention

This invention relates to a developer carrying member used when an electrostatic latent image formed on an electrostatic latent image bearing member such as an electrophotographic photosensitive member or an electrostatic recording dielectric member is developed. It also relates to a developing apparatus, a developing method, an image forming apparatus and a process cartridge using such a developer carrying member.

2. Related Background Art

As a developing apparatus used when electrostatic latent images formed on a photosensitive drum serving as an electrostatic latent image bearing member are developed by the use of a magnetic toner as a one-component type developer, a developing assembly as shown in FIG. 7 is known in the art. As shown in FIG. 7, a developer container 53 as shown in FIG. 6 holds a magnetic toner 54 as one-component type developer, and electric charge having a polarity reverse to the electric charge of the electrostatic image formed on a photosensitive drum 51 and to the development standard potential is imparted to magnetic toner particles by the friction between particles of the magnetic toner and the friction between a developing sleeve 58 as a developer carrying member and the magnetic toner particles. The magnetic toner thus charged is applied on the developing sleeve 58 by means of a magnetic blade 52 and then transported to the developing zone D at which the photosensitive drum 51 and the developing sleeve 58 face each other, where the magnetic toner carried on the developing sleeve 58 by the action of the magnetic field formed by a magnet 55 stationarily set therein is attracted to develop the electrostatic latent image on the photosensitive drum 51. Letter symbols A and B denote the rotating directions of the developing sleeve 58 and the photosensitive drum 51, respectively. Reference numeral 59 denotes a development bias means for applying a development bias voltage at the time of development; and 60, an agitating blade for agitating the magnetic toner 54 inside the developer container 53.

When, however, such a one-component type developer is used, it is difficult to control the toner charging. Although various trials have been applied to developers, the problems concerning non-uniformity of charging and running instability of charging are not completely solved.

Especially as the developing sleeve is repeatedly rotated, the charge quantity of the toner applied on the developing sleeve becomes too large by contact with the developing sleeve, so that the toner and the developing sleeve attract each other on account of the reflective force of the developing sleeve surface and the toner turns immobile on the surface of the developing sleeve, thus, it does not move from the developing sleeve to the electrostatic latent image bearing member (drum). Such a phenomenon, what is called "charge-up", tends to occur. Once such charge-up has occurred, the toner forming an upper layer on the sleeve is hard to electrify and the quantity of toner participating in development is reduced, bringing about problems of, for example, line images being thinner and image density of solid images being thinner.

Moreover, the toner layer may be formed in a different state at image areas (areas where toner is consumed) and non-image areas to have been charged in different conditions. Hence, when, e.g., a position where a solid image with a high image density has been once formed by development comes to the development position according to the next rotation of the developing sleeve and a latent halftone image is developed, a sign of the solid image may appear on the developed halftone image. Such a phenomenon, what is called "sleeve ghost", tends to occur.

Recently, in order to make electrophotographic image quality much higher, toners have been made smaller in particle diameter and made finer. For example, in order to improve image quality such as resolution and sharpness to faithfully reproduce electrostatic latent images, it is common to use toners with a weight average particle diameter of about 6 to 9 μm. Also, for the purpose of making copying time shorter and power consumption smaller, there is a tendency toward lower fixing temperature. Under such circumstances, the toner more tends to electrostatically adhere onto the developing sleeve and at the same time undergo external physical force, so that contamination of the developing sleeve surface and toner fusing are liable to occur.

As a method for preventing such phenomenons, it is proposed to use in a developing apparatus a developing sleeve comprising a metal substrate provided thereon with a coat layer formed of a resin in which a solid lubricant and a conductive fine powder such as carbon powder are dispersed. According to the use of this method, the above phenomenons seem to greatly decrease. In this method, however, the surface of the developing sleeve is not sufficiently even in its shape and also the surface of the developing sleeve has a smaller area to which triboelectric charges are imparted, so that uniform charging of toner and a rise in toner charging (or the quick electrification of toner) can not be sufficient in some cases. Accordingly, black spots around character line images may occur and image density may lower in an environment of high temperature and high humidity. Thus, this method is still not well satisfactory, which also leaves a problem concerning running performance because the coat layer may become brittle.

Japanese Patent Application Laid-open No. 3-200986 discloses a method in which a developing sleeve comprising a metal substrate provided thereon with a conductive coat layer formed of a resin in which a solid lubricant, a conductive fine powder such as carbon powder and also spherical particles are dispersed is used in the developing apparatus. When this method is used, the developing sleeve surface can have an even shape, charging can be uniform and wear resistance can be improved. However, even in this developing sleeve, its running performance is sought to be more improved, e.g., to be improved in the ability to impart quick and uniform charging to toner and in wear resistance of the conductive coat layer, and to prevent toner contamination and melt-adhesion of toner once the sleeve has worn.

Japanese Patent Application Laid-open No. 2-176762 discloses a method in which a developing sleeve containing a charge control agent in a coat layer formed on the surface of the developing sleeve is used in the developing apparatus. When this method is used, a rise in toner charging and the uniform charging of toner can be improved to a certain extent, but the surface of the developing sleeve can not still have a charge-providing ability good enough to be well effective for a high image quality superior in character line sharpness and for the stability of image density in an environment of high temperature and high humidity. Also, this method can not still be satisfactory in respect of running performance, and is sought to be further improved.

SUMMARY OF THE INVENTION

Accordingly, an object of the present invention is to provide a developer carrying member in which a conductive coat layer formed on its surface may be hardly deteriorated by repeated copying or running, and which has a high durability and can give stable images; and a developing apparatus, a developing method, an image forming apparatus and a process cartridge having such a developer carrying member.

Another object of the present invention is to provide a developer carrying member which does not cause problems such as density decrease, sleeve ghost and fog over a long period of time even under different environmental conditions and can stably give high-grade images having a good character line sharpness and a high image density; and a developing apparatus, a developing method, an image forming apparatus and a process cartridge which have such a developer carrying member.

Still another object of the present invention is to provide a developer carrying member which can prevent toners from being non-uniformly charged on the developer carrying member surface when toners having small particle diameters are used, and can quickly and properly impart charges to toners; and a developing apparatus, a developing method, an image forming apparatus and a process cartridge which have such a developer carrying member.

The present invention provides a developer carrying member comprising a substrate and a coat layer which covers the surface of the substrate, wherein;

the coat layer contains at least a binder resin, conductive spherical particles having a number average particle diameter of from 0.3 $\mu$m to 30 $\mu$m and a true density of 3 g/cm$^3$ or below, and a nitrogen-containing heterocyclic compound; the particles and the compound being dispersed in the binder resin.

The present invention also provides a developing apparatus comprising;

a developer container holding a developer; and a developer carrying member for carrying the developer held in the developer container and transporting the developer to the developing zone;

wherein the developer carrying member comprises a substrate, and a coat layer which covers the surface of the substrate;

the coat layer containing at least a binder resin, conductive spherical particles having a number average particle diameter of from 0.3 $\mu$m to 30 $\mu$m and a true density of 3 g/cm$^3$ or below, and a nitrogen-containing heterocyclic compound; the particles and the compound being dispersed in the binder resin.

The present invention still also provides a developing method comprising the steps of;

allowing a developer carrying member to carry a developer held in a developer container, so that a developer layer is formed on the surface of the developer carrying member;

transporting the developer carried on the developer carrying member, to the developing zone at which the developer carrying member and an electrostatic latent image bearing member face each other; and developing an electrostatic latent image on the electrostatic latent image bearing member with the developer carried on the developer carrying member;

wherein the developer carrying member comprises a substrate, and a coat layer which covers the surface of the substrate;

the coat layer containing at least a binder resin, conductive spherical particles having a number average particle diameter of from 0.3 $\mu$m to 30 $\mu$m and a true density of 3 g/cm$^3$ or below;, and a nitrogen-containing heterocyclic compound the particles and the compound being dispersed in the binder resin.

The present invention further provides an image forming apparatus comprising;

an electrostatic latent image bearing member for bearing an electrostatic latent image, and a developing apparatus for developing the electrostatic latent image to form a developed image;

the developing apparatus comprising;

a developer container holding a developer; and a developer carrying member for carrying the developer held in the developer container and transporting the developer to the developing zone;

wherein the developer carrying member comprises a substrate, and a coat layer which covers the surface of the substrate;

the coat layer containing at least a binder resin, conductive spherical particles having a number average particle diameter of from 0.3 $\mu$m to 30 $\mu$m and a true density of 3 g/cm$^3$ or below, and a nitrogen-containing heterocyclic compound; the particles and the compound being dispersed in the binder resin.

The present invention still further provides a process cartridge detachably mountable on a main assembly of an image forming apparatus, comprising;

an electrostatic latent image bearing member for bearing an electrostatic latent image, and a developing means for developing the electrostatic latent image;

the developing means comprising;

a developer container holding a developer; and a developer carrying member for carrying the developer held in the developer container and transporting the developer to the developing zone;

wherein the developer carrying member comprises a substrate, and a coat layer which covers the surface of the substrate;

the coat layer containing at least a binder resin, conductive spherical particles having a number average particle diameter of from 0.3 $\mu$m to 30 $\mu$m and a true density of 3 g/cm$^3$ or below, and a nitrogen-containing heterocyclic compound; the particles and the compound being dispersed in the binder resin.

DESCRIPTION OF THE PREFERRED EMBODIMENTS

Figure 1:
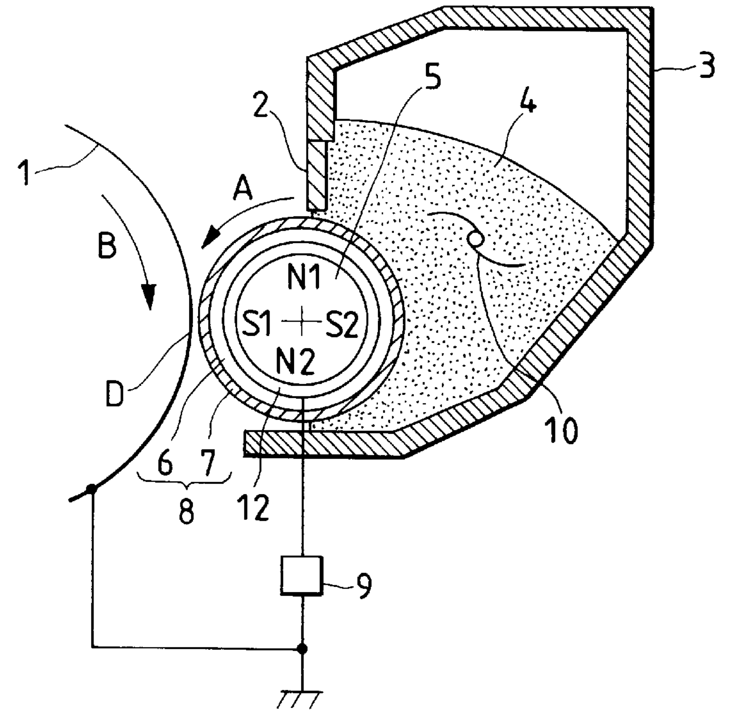
FIG. 1 schematically illustrates a developing apparatus according to an embodiment of the present invention, having a developer carrying member on which the coat layer of the present invention is formed.

As a result of extensive studies of the problems stated above, the present inventors have discovered that the charging performance for rapidly and uniformly charging the developer and the permanence of this charging performance can be more greatly improved than those of conventional cases, when the coat layer on the surface of the developer carrying member is constituted of a resin in which a nitrogen-containing heterocyclic compound is incorporated in addition to specific conductive spherical particles which impart irregularities (or concavities and convexities).

The conductive spherical particles used in the coat layer which covers the surface of a substrate constituting the developer carrying member of the present invention will be described.

The conductive spherical particles used in the present invention may have a number average particle diameter of from 0.3 μm to 30 μm, and preferably from 2 μm to 20 μm, and satisfy a true density of 3 $g/cm^3$ or below.

Such conductive spherical particles are added so that the surface of the coat layer in the developer carrying member can retain a uniform surface roughness and also, even when the surface of the coat layer has worn, the surface roughness of the coat layer is less in its change and contamination by toner and melt-adhesion of toner is hard to bring about.

The conductive spherical particles interact with the nitrogen-containing heterocyclic compound contained in the coat layer, and make higher the effect of charge control attributable to the nitrogen-containing heterocyclic compound and more improving quick and uniform charging. Also, they are effective for the achievement of stabler charging performance.

Conductive spherical particles having a number average particle diameter smaller than 0.3 μm are not preferable because the uniform roughness cannot be effectively imparted to the surface of the coat layer, the charging performance cannot be effectively improved, the quick and uniform charging of the developer can be insufficient and the charge-up of toner, contamination by toner and melt-adhesion of toner may occur on the wear of the coat layer to cause poor character line sharpness, serious ghost and a decrease in image density. Those having a number average particle diameter larger than 30 μm are also not preferable because the surface of the coat layer may become excessively rough, and it is difficult for the toner to be well charged, and in addition, mechanical strength of the coat layer is lowered.

The conductive spherical particles used in the present invention may have a true density of 3 $g/cm^3$ or below, preferably 2.7 $g/cm^3$ or below, and more preferably from 0.9 to 2.3 $g/cm^3$. Conductive spherical particles having a true density exceeding 3 $g/cm^3$ are not preferable because the dispersibility of the spherical particles in the coat layer may be insufficient to make it difficult to impart a uniform roughness to the surface of the coat layer and also to make it difficult for the nitrogen-containing heterocyclic compound to be uniformly dispersed, resulting in an insufficient uniform charging of the toner and an insufficient strength of the coat layer. Conductive spherical particles having a too small true density are also not preferable because the spherical particles may be insufficiently dispersed in the coat layer.

In the present invention, as conductivity of the conductive spherical particles, the particles may have a volume resistivity of $10^6$ Ω·cm or below, and preferably a volume resistivity of from $10^3$ Ω·cm to $10^6$ Ω·cm.

In the present invention, conductive spherical particles having a volume resistivity higher than $10^6$ Ω·cm are not preferable because spherical particles which are worn and laid bare on the surface of the coat layer may serve as nuclei around which toner contamination and melt-adhesion tend to occur and also make it difficult to achieve quick and uniform charging.

In the present invention, the "spherical" in the conductive spherical particles refers to particles having a major axis/minor axis ratio of from 1.0 to 1.5. Accordingly, as employed herein, the term "spherical" covers conductive particles which are generally spherical in shape, each particle having a major axis/minor axis ratio from 1.0 to 1.5, wherein the major axis and the minor axis represent, respectively, the longest distance and the shortest distance between two planes which are parallel to each other and in contact with the surface of the particle. It is preferable to use particles having a major axis/minor axis ratio of from 1.0 to 1.2.

Conductive spherical particles having a major axis/minor axis ratio higher than 1.5 are not preferable in view of rapid and uniform charging of the toner and strength of the coat layer, because the dispersibility of the conductive spherical particles and the nitrogen-containing heterocyclic compound in the coat layer may lower, and the surface roughness of the coat layer may be non-uniform.

The conductive spherical particles used in the present invention may preferably be obtained through a method which includes methods as described below, but is not limited thereto.

A method for obtaining particularly preferable conductive spherical particles used in the present invention includes, e.g., a method in which spherical resin particles or mesocarbon microbeads are fired and thereby carbonized and/or graphitized to produce spherical carbon particles having a low density and a good conductivity. Resin used here in the spherical resin particles may include, e.g., phenol resins, naphthalene resins, furan resins, xylene resins, divinylbenzene polymers, styrene-divinylbenzene copolymers, and polyacrylonitrile.

The mesocarbon microbeads can be usually produced by subjecting spherical crystals formed in the course of heating and firing a mesopitch, to washing with a large quantity of solvent such as tar, middle oil or quinoline.

A method for obtaining more preferable conductive spherical particles includes a method in which a bulk-mesophase pitch is applied on the surfaces of spherical particles such as phenol resin, naphthalene resin, furan resin, xylene resin, divinylbenzene polymer, styrene-divinylbenzene copolymer or polyacrylonitrile particles by a mechanochemical method, and the particles thus coated are heated in an oxidative atmosphere or in vacuo, followed by firing in an inert atmosphere or in vacuo, thereby carbonizing the interior of the particles and graphitizing the exterior of the particles, thus obtaining conductive spherical carbon particles. The spherical carbon particles obtained by this method are more preferred because the spherical carbon particles obtained when graphitized can be more crystallized at their covered portions to improve in conductivity.

When the conductive spherical carbon particles are obtained by any one of the above methods, the conductivity of the resulting spherical carbon particles can be controlled by changing the conditions of firing, and such particles are preferably used in the present invention. In order to more improve the conductivity, the spherical carbon particles obtained by the above methods may optionally be coated with conductive metal and/or metal oxide to such an extent that the true density of the conductive spherical particles does not exceed 3 $g/cm^3$.

As another method for obtaining the conductive spherical particles used in the present invention, there is a method in which core particles comprised of spherical resin particles and conductive fine particles having smaller particle diameters than the core particles are mechanically mixed in a suitable mixing ratio to cause the conductive fine particles to uniformly adhere to the peripheries of the core particles by the action of van der Waals force and electrostatic force, and thereafter the surfaces of the core particles are softened by local temperature rise caused by, e.g., imparting mechanical impact so that the conductive fine particles form coats on the core particle surfaces, obtaining spherical resin particles subjected to conductivity-imparting treatment.

As the core particles, it is preferable to use spherical resin particles comprised of an organic compound and having a small true density. The resin therefor may include, e.g., PMMA, acrylic resin, polybutadiene resin, polystyrene resin, polyethylene, polypropylene, polybutadiene, or copolymers of any of these, benzoguanamine resin, phenol resins, polyamide resins, nylons, fluorine resins, silicone resins, epoxy resins and polyester resins.

As the conductive fine particles (coat particles) adhered to the surfaces of the core particles (base particles), particles having a particle diameter of ⅛ or less of the base particles may preferably be used to uniformly form the coats of conductive fine particles.

As still another method for obtaining the conductive spherical particles used in the present invention, there is a method in which the conductive fine particles are uniformly dispersed in spherical resin particles to produce conductive spherical particles with the conductive fine particles dispersed therein. A method for uniformly dispersing the conductive fine particles in the spherical resin particles includes, e.g., a method in which a binder resin and the conductive fine particles are kneaded so as to disperse the latter in the former, and thereafter the product is cooled to solidify and then pulverized into particles having a given particle diameter, followed by mechanical treatment and thermal treatment to make the particles spherical; and a method in which a polymerization initiator, the conductive fine particles and other additives are added in polymerizable monomers and uniformly dispersed therein by means of a dispersion machine to give a monomer composition which is suspended and polymerized in an aqueous phase containing a dispersion stabilizer by means of a stirrer so as to provide a given particle diameter, obtaining spherical particles with conductive fine particles dispersed therein.

The conductive spherical particles with the conductive fine particles dispersed therein, obtained by these methods may be further mechanically mixed with additional conductive fine particles having smaller particle diameters than the core particles, in a suitable mixing ratio to cause the additional conductive fine particles to uniformly adhere to the peripheries of the spherical resin particles by the action of van der Waals force and electrostatic force, and thereafter the surfaces of the resin particles with the conductive fine particles dispersed therein are softened by local temperature rise caused by imparting mechanical impact so that the additional conductive fine particles form coats on the resin particle surfaces, obtaining spherical resin particles which further improve in conductivity.

With the constitution of the coat layer formed on the developer carrying member of the present invention, the nitrogen-containing heterocyclic compound is incorporated in the binder resin of the coat layer in combination with the conductive spherical particles described above. This brings about a great improvement in the charging performance of the coat layer, so that the object of the present invention can be achieved.

More specifically, the incorporation of the nitrogen-containing heterocyclic compound in the binder resin of the coat layer in combination with the conductive spherical particles makes it easy for the nitrogen-containing heterocyclic compound to be uniformly dispersed in the coat layer on account of the interaction between the compound having a nitrogen-containing heterocyclic structure and the conductive spherical particles. Also, the presence of the conductive spherical particles in the binder resin contained in the coat layer makes it difficult for the toner with a high charge quantity to adhere to the surface of the binder resin of the coat layer. Hence, the charge controllability inherent in the nitrogen-containing heterocyclic compound can be effectively exhibited. Thus, the use of the developer carrying member having the coat layer of the present invention enables the toner to be quickly and uniformly charged, so that images having a good character line sharpness and a high image density can be stably provided even under different environmental conditions.

The uniform irregularities on the coat layer surface which are provided by the conductive spherical particles further promote the uniform charging of the toner and also the conductive spherical particles have an effect on that toner contamination or toner melt-adhesion on the coat layer surface is hard to bring about, so that the charge controllability of the coat layer, attributable to the nitrogen-containing heterocyclic compound, can be improved also in respect of its permanence. Thus, when the developer carrying member having the coat layer of the present invention is used, the surface of the developer carrying member is hard to deteriorate due to repeated copying or running, the problems such as density decrease, sleeve ghost and fog do not occur over a long period of time even under different environmental conditions, and high-grade images having a good character line sharpness and a high image density can be stably obtained.

The above nitrogen-containing heterocyclic compound may preferably have a number average particle diameter of 20 $\mu$m or smaller, and preferably from 0.1 $\mu$m to 15 $\mu$m, which is desirably used. A nitrogen-containing heterocyclic compound having a number average particle diameter larger than 20 $\mu$m is not preferable because the nitrogen-containing heterocyclic compound is poorly dispersed in the coat layer so that the charging performance may not be effectively improved.

The nitrogen-containing heterocyclic compound used in the present invention may include compounds having a nitrogen-containing heterocyclic group such as imidazole, imidazoline, imidazolone, pyrazoline, pyrazole, pyrazolone, oxazoline, oxazole, oxazolone, thiazoline, thiazole, thiazolone, selenazoline, selenazole, selenazolone, oxadiazole, thiadiazole, tetrazole, benzoimidazole, benzotriazole, benzoxazole, benzothiazole, benzoselenazole, pyrazine, pyrimidine, pyridazine, triazine, oxazine, thiazine, tetrazine, polyazaine, pyridazine, pyrimidine, pyrazine, indole, isoindole, indazole, carbazole, quinoline, pyridine, isoquinoline, cinnoline, quinazoline, quinoxaline, phthalazine, purine, pyrrole, triazole or phenazine. In the present invention, imidazole compounds are preferred because they enhance the effect exhibited by the developer carrying member of the present invention.

Of imidazole compounds, in particular, the imidazole compounds represented by the following formulas (1) and (2) are more preferred from the viewpoints of the quick and uniform electrification of toner and the coat layer strength.

(1)

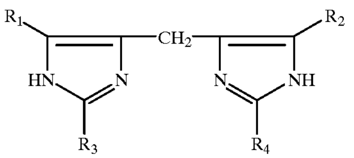

wherein $R_1$ and $R_2$, are each independently a hydrogen atom, an alkyl group, an aralkyl group or an aryl group, and $R_3$ and $R_4$ are each independently a straight-chain alkyl group containing 3 to 30 carbon atoms.

(2)

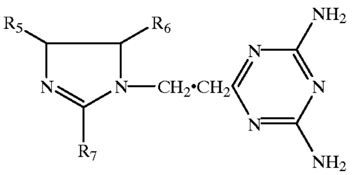

wherein $R_5$ and $R_6$, are each independently a hydrogen atom, an alkyl group, an aralkyl group or an aryl group, and $R_7$ is a straight-chain alkyl group containing 3 to 30 carbon atoms.

The reason is considered to be that since the imidazole compounds of the structures represented by the above formulas (1) and (2) have the straight-chain alkyl groups containing 3 to 30 carbon atoms, they are good in their dispersibility into the resin of the coat layer, and when dispersed into the coat layer in the presence of electroconductive particles, the dispersibility of the imidazole compounds and the conductive particles in the coating layer is enhanced due to their mutual interaction.

The nitrogen-containing heterocyclic group that constitutes the nitrogen-containing heterocyclic compound may be a single ring, or a ring condensed with a different group, or may have a substituent.

When the nitrogen-containing heterocyclic group has a substituent, such a substituent may include, e.g., an alkyl group, an aralkyl group, an alkenyl group, an alkynyl group, an alkoxyl group, an aryl group, a substituted amino group, a ureido group, a urethane group, an aryloxy group, a sulfamoyl group, a carbamoyl group, an alkyl- or arylthio group, an alkyl- or arylsulfonyl group, an alkyl- or arylsulfinyl group, a hydroxyl group, a halogen atom, a cyano group, a sulfo group, an aryloxycarbonyl group, an acyl group, an alkoxycarbonyl group, an acyloxy group, a carbonamide group, a sulfonamide group, a carboxyl group, a phosphoric acid amide group, a diacylamino group and an imide group.

These substituents may each have a further substituent. Such a further substituent may include the substituents enumerated here.

When the nitrogen-containing heterocyclic group is a ring condensed with a different group, such a different group may include the above nitrogen-containing heterocyclic rings; aromatic hydrocarbon rings such as benzene, naphthalene, fluorene and pyrene; aromatic heterocyclic rings such as furan, thiophene, oxadiazole and benzoxadiazole; and also those combined with any of the above aromatic rings directly or via a connecting group, as exemplified by biphenyl, stilbene and oxazole. The different group with which the nitrogen-containing heterocyclic ring is condensed may have a further substituent. Examples of such a further substituent include the substituents enumerated for those of the nitrogen-containing heterocyclic ring.

In the coat layer constituting the developer carrying member of the present invention, lubricating particles may be further used in combination and dispersed. This is preferable since the present invention can be made more effective. Such lubricating particles may include, e.g., particles of graphite, molybdenum disulfide, boron nitride, mica, graphite fluoride, silver-niobium selenide, calcium chloride-graphite, talc, and fatty acid metal salts such as zinc stearate. Of these, particularly, graphite particles may preferably be used because the conductivity of the coat layer is not damaged.

As the lubricating particles, those having a number average particle diameter of preferably from 0.2 to 20 μm, and more preferably from 1 to 15 μm, may be used.

Lubricating particles having a number average particle diameter smaller than 0.2 μm are not preferable because it is difficult to attain sufficient lubricating properties. Those having a number average particle diameter larger than 20 μm are not preferable in view of uniform charging of the toner and strength of the coat layer, because the surface roughness of the coat layer may be non-uniform.

As the binder resin in the coat layer constituting the developer carrying member of the present invention, it is possible to use, e.g., thermoplastic resins such as styrene resins, vinyl resins, polyether sulfone resin, polycarbonate resin, polyphenylene oxide resin, polyamide resins, fluorine resins, cellulose resins and acrylic resins; and photocurable resins such as epoxy resins, polyester resins, alkyd resins, phenol resins, melamine resins, polyurethane resins, urea resins, silicone resins and polyimide resins. In particular, more preferred are those having release properties, such as silicone resins and fluorine resins, and those having good mechanical properties, such as polyether sulfone, polycarbonate, polyphenylene oxide, polyamide, phenol, polyester, polyurethane, styrene resins and acrylic resins.

In the present invention, the coat layer of the developer carrying member may preferably have a volume resistivity of $10^3$ Ω·cm or below, and more preferably from $10^3$ to $10^{-2}$ Ω·cm. If the coat layer has a volume resistivity higher than $10^3$ Ω·cm, the charge-up of toner tends to occur, which may cause ghost or density decrease.

In the present invention, in order to control the volume resistivity of the coat layer, different conductive fine particles may preferably be dispersed and incorporated into the coat layer, which are used in combination with the conductive spherical particles and nitrogen-containing heterocyclic compound described above.

Such different conductive fine particles may preferably be those having a number average particle diameter of 1 μm or smaller, and more preferably from 0.01 to 0.8 μm.

If the different conductive fine particles have a number average particle diameter larger than 1 μm, the volume resistivity of the coat layer is difficult to control at its low level, so that the charge-up of toner is able to occur.

The different conductive fine particles usable in the present invention may include, e.g., carbon blacks such as furnace black, lamp black, thermal black, acetylene black and channel black; particles of metal oxides such as titanium oxide, tin oxide, zinc oxide, molybdenum oxide, potassium titanate, antimony oxide and indium oxide; particles of conductive metals such as aluminum, copper, silver and nickel; and particles of inorganic fillers such as graphite, metal fibers and carbon fibers.

The developer carrying member of the present invention is constituted as described below.

The developer carrying member of the present invention is chiefly constituted of a metal cylinder serving as the substrate, and the coat layer which covers the metal cylinder along its periphery. As the metal cylinder, a stainless steel cylinder or an aluminum cylinder may preferably be used.

The proportions of the make-up of the respective components constituting the coat layer will be described below, which are ranges preferred in the present invention.

The conductive spherical particles dispersed in the coat layer may preferably be in a content ranging from 2 to 120 parts by weight, and preferably from 2 to 80 parts by weight, based on 100 parts by weight of the binder resin.

If the conductive spherical particles are in a content less than 2 parts by weight, the addition of the conductive spherical particles can be less effective. If they are in a content more than 120 parts by weight, the charging performance of the toner may become too low.

The nitrogen-containing heterocyclic compound incorporated in the coat layer in combination with the conductive spherical particles may preferably be in a content ranging from 0.5 to 60 parts by weight, and more preferably from 1 to 50 parts by weight, based on 100 parts by weight of the binder resin.

If the nitrogen-containing heterocyclic compound is in a content less than 0.5 part by weight, the addition of the nitrogen-containing heterocyclic compound can be less effective. If it is in a content more than 60 parts by weight, it may be difficult to control the volume resistivity of the coat layer at its low level, tending to cause the charge-up of toner and also it may be difficult to make the addition of the conductive spherical particles effective.

In the present invention, the ratio of the conductive particle content to the nitrogen-containing heterocyclic compound content in the coat layer is preferably 1:0.4 to 5.0, more preferably 1:0.7 to 4.5, still more preferably 1:1.2 to 4.0, considering that the electrifying properties (or chargeability) of the coat layer and the permanence of the electrifying properties are further improved.

When the above content ratio is less than 0.4, the quick and uniform electrification of toner is hard to satisfactorily control, and when more than 5.0, the quick and uniform electrification of toner is lowered to some extent, and the permanence of the electrifying properties is deteriorated.

When the lubricating particles are used in combination and incorporated in the coat layer, the lubricating particles may preferably be in a content ranging from 5 to 120 parts by weight, and more preferably from 10 to 100 parts by weight, based on 100 parts by weight of the binder resin.

If the lubricating particles are in a content more than 120 parts by weight, the coat strength may lower and the charge quantity of the toner may decrease. If it is in a content less than 5 parts by weight, the surface of the coat layer may be contaminated by the toner when, e.g., put into long-term service using a toner with small particle diameters of 7 $\mu$m or below.

When the different conductive fine particles are used in combination and dispersedly incorporated in the coat layer, the different conductive fine particles may preferably be in a content not more than 40 parts by weight, and more preferably in the range of from 2 to 35 parts by weight, based on 100 parts by weight of the binder resin.

Use of the different conductive fine particles in a content more than 40 parts by weight is not preferable because the coat strength may lower and the charge quantity of the toner may decrease.

In the present invention, the coat layer may preferably have a surface roughness, as center-line average roughness (hereinafter "Ra"), within the range of from 0.3 to 3.5 $\mu$m, and more preferably within the range of from 0.5 to 3.0 $\mu$m. If the coat layer has an Ra less than 0.3 $\mu$m, the transport performance of the toner may lower so that an image density may be insufficient. If the coat layer has an Ra exceeding 3.5 $\mu$m, the transport quantity of the toner becomes excess so that the toner may not be sufficiently charged. Thus, such Ra's are not preferable.

The coat layer constituted as described above may preferably have a layer thickness of 25 $\mu$m or less, more preferably 20 $\mu$m or less, and still more preferably from 4 to 20 $\mu$m. Such a thickness is preferable for obtaining a uniform layer thickness. The thickness is not particularly limited to this layer thickness. The layer thickness depends on the materials used in the coat layer, and can be attained when formed in a coating weight of about 4,000 to 20,000 mg/$m^2$.

The developing apparatus, the image forming apparatus and the process cartridge in which the developer carrying member as described above is incorporated will be described below.

FIG. 1 diagrammatically illustrates a developing assembly according to an embodiment of the developing apparatus having the developer carrying member of the present invention.

As shown in FIG. 1, a latent image bearing member, e.g., an electrophotographic photosensitive drum 1, holding an electrostatic latent image formed by a known process is rotated in the direction of an arrow B. A developing sleeve 8 as the developer carrying member carries a one-component type developer 4 having a magnetic toner, fed by a hopper 3 serving as the developer container, and is rotated in the direction of an arrow A. Thus, the developer 4 is transported to the developing zone D where the developing sleeve 8 and the photosensitive drum 1 face each other. As shown in FIG. 1, inside the developing sleeve 8, a magnet roller 5 internally provided with a magnet is provided so that the developer 4 is magnetically attracted and held onto the developing sleeve 8.

The developing sleeve 8 used in the developing assembly of the present invention comprises a metal cylinder 6 as the substrate, having thereon a coat layer 7. Inside the hopper 3, an agitating blade 10 for agitating the developer 4 is installed. Reference numeral 12 denotes a gap, showing that the developing sleeve 8 and the magnet roller 5 are out of touch with each other.

The developer 4 gains triboelectric charges capable of developing the electrostatic latent image on the photosensitive drum 1, due to the friction between the particles of the magnetic toner and between the toner particles and the coat layer 7 on the developing sleeve 8. In the example shown in FIG. 1, in order to control the layer thickness of the developer 4 transported to the developing zone D, a magnetic control blade 2 made of a ferromagnetic metal, serving as a developer layer thickness control member, vertically extends downwards from the hopper 3 in a way of facing on the developing sleeve 8, leaving a gap of about 50 to 500 μm wide between its lower end and the surface of the developing sleeve 8. The magnetic line of force exerted from a magnetic pole N1 of the magnet roller 5 is converged to the magnetic control blade 2 to form on the developing sleeve 8 a thin layer of the developer 4. In the present invention, a non-magnetic blade may also be used in place of the magnetic control blade 2.

The thickness of the thin layer of the developer 4, thus formed on the developing sleeve 8, may preferably be smaller than the minimum gap between the developing sleeve 8 and the photosensitive drum 1 in the developing zone D.

It is effective to incorporate the developer carrying member in the developing assembly of the type in which the electrostatic latent image is developed through such a developer thin layer, i.e., a non-contact type developing assembly, especially because it is a developing apparatus that can more uniformly and rapidly charge the toner to achieve a higher product quality and a higher image quality. The developer carrying member of the present invention may also be applied in a developing assembly of the type in which the thickness of the developer layer is larger than the minimum gap between the developing sleeve 8 and the photosensitive drum 1 in the developing zone D, i.e., a contact type developing assembly.

To avoid complication, the non-contact developing assembly as described above is taken as an example in the following description.

In order to attract the one-component type developer 4 having a magnetic toner, carried on the developing sleeve 8, a development bias voltage is applied to the developing sleeve 8 through a development bias power source 9 serving as a bias applying means. When a DC voltage is used as the development bias voltage, a voltage having a value intermediate between the potential at electrostatic latent image areas (the region rendered visible upon attraction of the developer 4) and the potential at back ground areas may preferably be applied to the developing sleeve 8.

In order to enhance the density of developed images or improve the gradation thereof, an alternating bias voltage may be applied to the developing sleeve 8 to form in the developing zone D a vibrating electric field whose direction alternately reverses. In such a case, an alternating bias voltage generated by superimposing the above DC voltage having a value intermediate between the potential at image areas being developed and the potential at back ground areas may preferably be applied to the developing sleeve 8.

In the case where a toner is attracted to high-potential areas of electrostatic latent images having high-potential areas and low-potential areas, what is called "regular development", a toner charged in a polarity reverse to the polarity of the electrostatic latent images is used.

In the case where a toner is attracted to low-potential areas of electrostatic latent images having high-potential areas and low-potential areas, what is called "reverse development", a toner charged in the same polarity as the polarity of the electrostatic latent images is used.

What is meant by the high-potential areas or the low-potential areas is expressed by the absolute value. In both cases, the developer 4 is charged due to friction with at least the developing sleeve 8.

Figure 2:
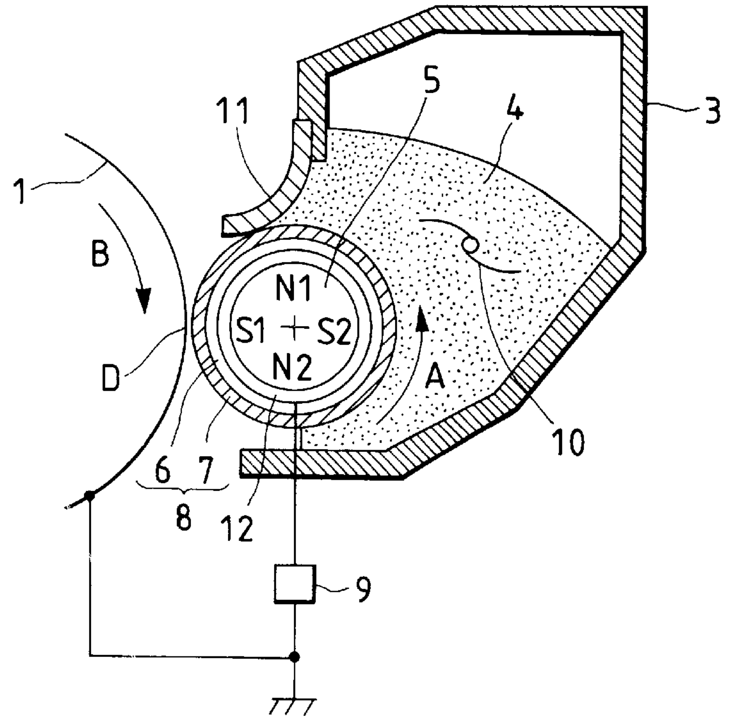
FIG. 2 schematically illustrates a developing apparatus according to another embodiment of the present invention, having a different developer layer thickness control member in the developing apparatus shown in FIG. 1.
Figure 3:
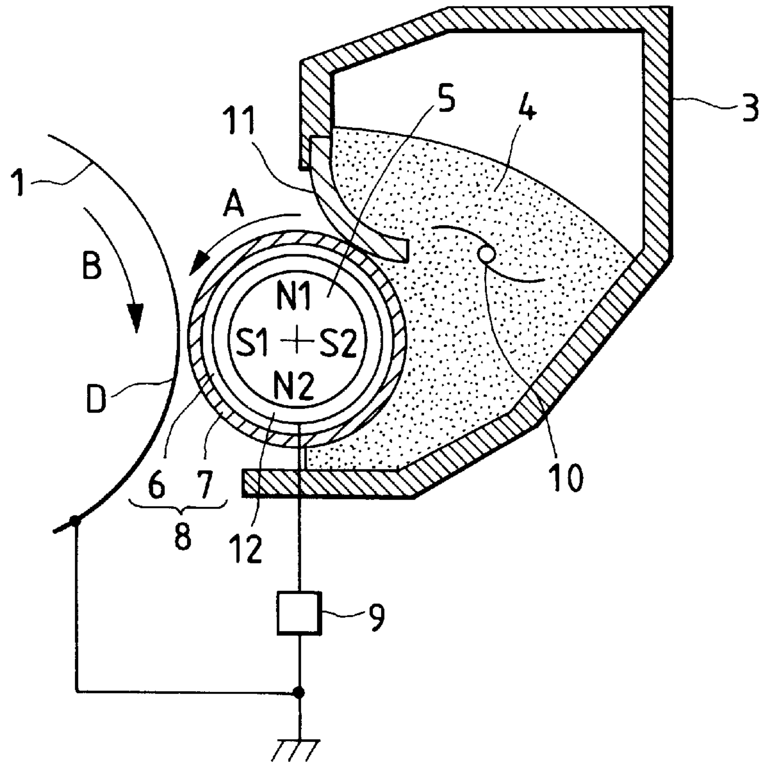
FIG. 3 schematically illustrates a developing apparatus according to a still another embodiment of the present invention, having a different developer layer thickness control member in the developing apparatus shown in FIG. 1.

FIG. 2 schematically illustrates the construction of a developing assembly according to a second embodiment of the developing apparatus of the present invention. FIG. 3 schematically illustrates the construction of a developing assembly according to a third embodiment of the developing apparatus of the present invention.

In the developing assemblies shown in FIGS. 2 and 3, an elastic control blade 11 comprised of a material having a rubber elasticity, such as urethane rubber or silicone rubber, or an elastic plate of a material having a metal elasticity, such as bronze or stainless steel, is used as the developer layer thickness control member to control the layer thickness of the magnetic toner 4 on the developing sleeve 8. In the developing assembly shown in FIG. 2, this elastic control blade 11 is brought into pressure touch with the developing sleeve 8 in the same direction as its rotational direction. In the developing assembly shown in FIG. 3, it is brought into pressure touch with the developing sleeve 8 in the direction reverse to its rotational direction.

In these developing assemblies, the developer layer thickness control member is elastically brought into pressure touch with the developing sleeve 8 through the developer layer to form the thin layer of the developer on the developing sleeve. Hence, as compared with such a case as described above with reference to FIG. 1, a much thinner developer layer can be formed on the developing sleeve 8.

The developing assemblies shown in FIGS. 2 and 3 have the same basic construction as the developing assembly shown in FIG. 1, and the same reference numerals denote basically the same members.

FIGS. 1 to 3, in any case, schematically exemplify the developing apparatus of the present invention. Needless to say, there may be various modes of the shape of the developer container (hopper 3), the presence or absence of the agitating blade 10 and the arrangement of magnetic poles. Of course, these assemblies can also be used in development using a two-component type developer comprising a toner and a carrier.

An example of the image forming apparatus of the present invention, employing the developing apparatus exemplified in FIG. 3, will be described below with reference to FIG. 4.

The surface of a photosensitive drum 101 as the electrostatic image bearing member is negatively charged by a contact (roller) charging means 119 as a primary charging means, and exposed to laser light 115 to form on the photosensitive drum 101 a digital latent image by image scanning. The latent image thus formed is developed by reversal development using a one-component type developer 104 having a magnetic toner in a hopper 103 and by means of a developing assembly having an elastic control blade 111 as the developer layer thickness control member and equipped with a developing sleeve 108 as the developer carrying member, internally provided with a magnet 105. As shown in FIG. 4, in the developing zone, the conductive substrate of the photosensitive drum 101 is earthed, and an alternating bias, a pulse bias and/or a DC bias is/are applied to the developing sleeve 108 through a bias applying means 109. A recording medium P is fed and delivered to the transfer zone, where the recording medium P is electrostatically charged by a contact (roller) transfer means 113 serving as a transfer means on its back surface (the surface opposite to the photosensitive drum side) through a voltage applying means 114, so that the developed image (toner image) on the surface of the photosensitive drum 101 is transferred to the recording medium P through the contact transfer means 113. The recording medium P separated from the photosensitive drum 101 is conveyed to a heat-pressure roller fixing assembly 117 serving as a fixing means, and subjected to a fixing process of the toner image on the recording medium P by means of the fixing assembly 117.

The one-component type developer 104 remaining on the photosensitive drum 101 after the step of transfer is removed by a cleaning means 118 having a cleaning blade 118*a*. When the remaining one-component type developer 104 is in a small quantity, the cleaning step may be omitted. After the cleaning, the residual charge on the surface of the photosensitive drum 101 is optionally eliminated by erasure exposure 116, and thus the procedure again starting from the charging step using the primary charging assembly 119 is repeated.

In a series of the above steps, the photosensitive drum (i.e., the latent image bearing member) 101 comprises a photosensitive layer and a conductive substrate, and is rotated in the direction of an arrow. In the developing zone D, the developing sleeve 108 formed of a non-magnetic cylinder, which is the developer carrying member, is rotated so as to move in the same direction as the surface movement of the photosensitive drum 101. Inside the developing sleeve 108, a multi-polar permanent magnet 105 (magnet roll) serving as a magnetic field generating means is provided in a non-rotatable state. The one-component type developer 104 held in the developing assembly 103 is applied on the surface of the developing sleeve 108, and, e.g., negative triboelectric charges are imparted to the magnetic toner due to the friction between its toner particles and the surface of the developing sleeve 108 and between particles of the magnetic toner. An elastic control blade 111 is also disposed so as to press the developing sleeve 108. Thus, the thickness of developer layer is controlled to be small (30 $\mu$m to 300 $\mu$m) and uniform so that a magnetic toner layer with a thickness smaller than the gap between the photosensitive drum 101 and the developing sleeve 108 in the developing zone is formed. The rotational speed of this developing sleeve 108 is regulated so that the peripheral speed of the developing sleeve 108 can be substantially equal or close to the peripheral speed of the photosensitive drum 101. In the developing zone D, an AC bias or a pulse bias may be applied as development bias voltage, to the developing sleeve 108 through a bias means 109. This AC bias may have a frequency (f) of 200 to 4,000 Hz and a peak-to-peak voltage (Vpp) of 500 to 3,000 V. When the magnetic toner is transferred in the developing zone D, the magnetic toner transfers to the side of the electrostatic latent image by the electrostatic force of the surface of the photosensitive drum 101 and the action of the development bias voltage such as AC bias or pulse bias.

In place of the elastic control blade 111, it is also possible to use a magnetic doctor blade made of a material such as iron.

As the primary charging means, the charging roller 119 is used as the contact charging means in the above description. It may also be a contact charging means such as a charging blade or a charging brush. It may still also be a non-contact corona charging means. However, the contact charging means is preferred considering that ozone generated by charging is less. As the transfer means, a contact charging means such as the transfer roller 113 is used in the above description. It may also be a non-contact corona transfer means. However, the contact transfer means is preferred considering that ozone generated by transfer is less.

Figure 5:
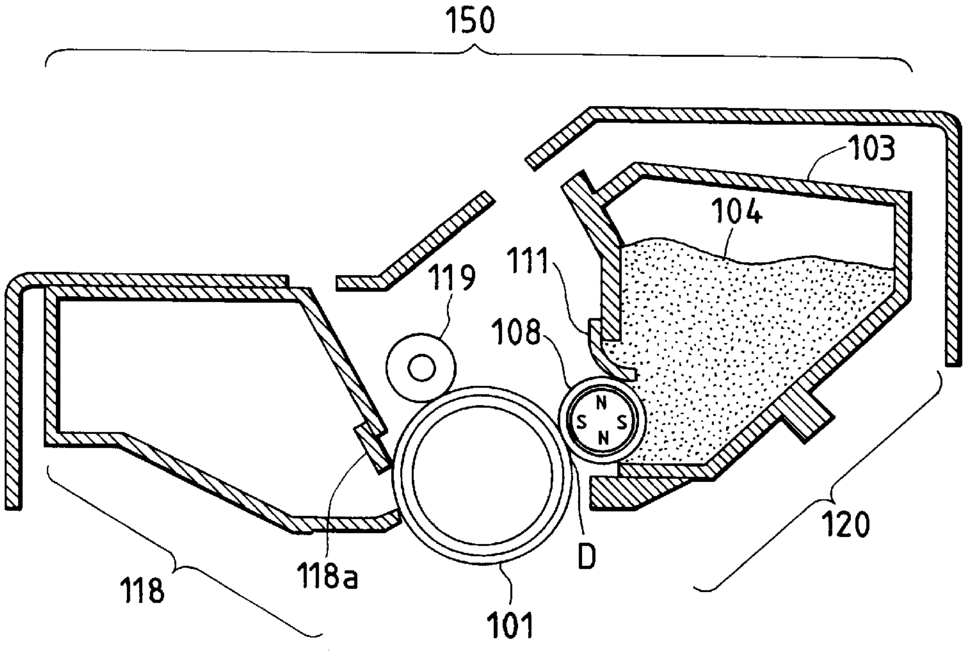
FIG. 5 schematically illustrates an example of the process cartridge of the present invention.
Figure 7:
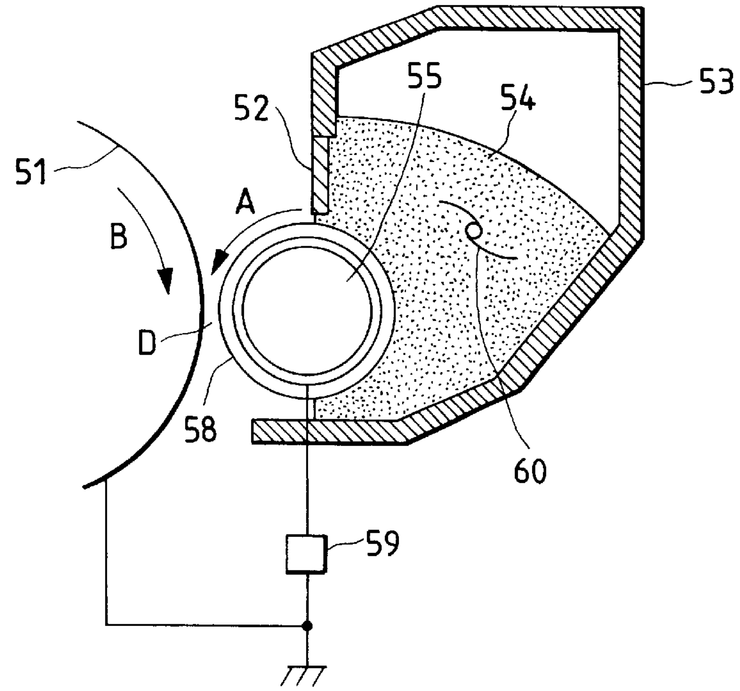
FIG. 7 diagrammatically illustrates a conventional developing apparatus having a developer carrying member on which no resin coat layer is formed.

FIG. 5 illustrates an example of the process cartridge of the present invention.

Figure 4:
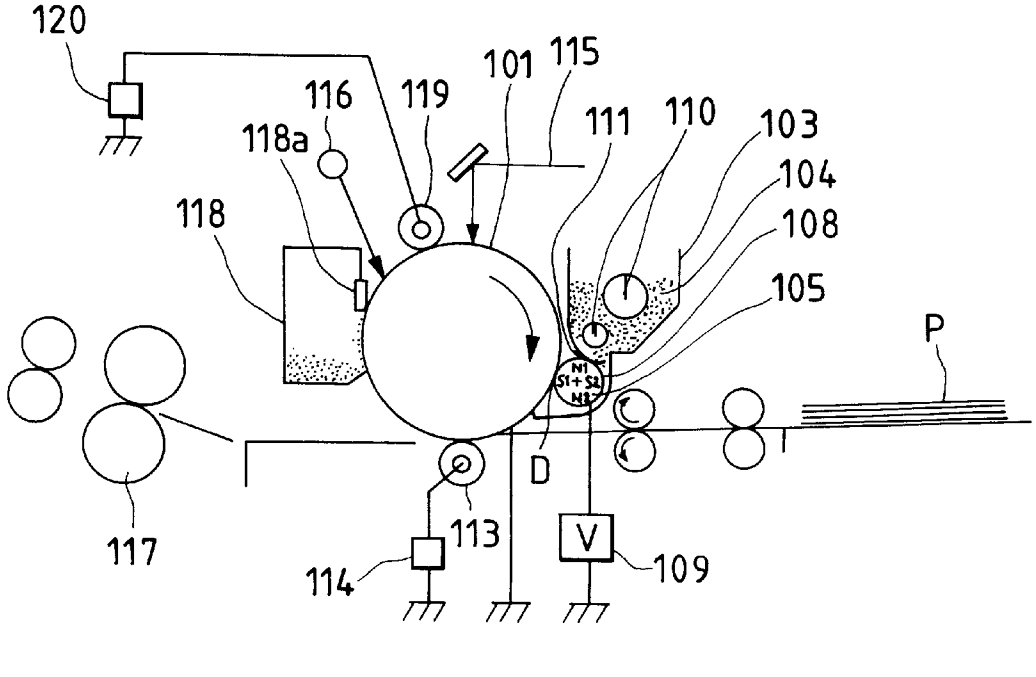
FIG. 4 schematically illustrates an image forming apparatus of the present invention.

In the following description of the process cartridge, constituent members having the same functions as those of the image forming apparatus described with reference to FIG. 4 are denoted by the same reference numerals.

In the process cartridge of the present invention, at least the developing apparatus as a developing means and the latent image bearing member are joined into one unit as a cartridge, and the process cartridge is provided detachably in the body of the image forming apparatus (e.g., a copying machine, a laser beam printer or a facsimile machine). In the embodiment shown in FIG. 5, a process cartridge 150 is exemplified in which a developing means 120, a drum-like latent image bearing member (a photosensitive drum) 101, a cleaning means 118 having a cleaning blade 118*a* and a primary charging means (a charging roller) 119 are joined into one unit. In this embodiment, the developing means 120 has an elastic control blade 111 and in a developer container 103 a one-component type developer 104 having a magnetic toner. At the time of development, a given electric field is generated across the photosensitive drum 101 and the developing sleeve 108 by applying a development bias voltage from a bias applying means, carrying out the developing step by the use of the developer 104. In order to preferably carry out this developing step, the distance between the photosensitive drum 101 and the developing sleeve 108 is very important.

In the above embodiment, a process cartridge has been described in which the four constituents, the developing means 120, the latent image bearing member 101, the cleaning means 118 and the primary charging means 119 are joined into one unit as a cartridge. In the present invention, at least two constituents, the developing means and the latent image bearing member, may be joined into one unit as a cartridge. Thus, three constituents, the developing means, the latent image bearing member and the cleaning means, and three constituents, the developing means, the latent image bearing member and the primary charging means, and other constituent(s), may be joined together into one unit as a cartridge.

Figure 6:
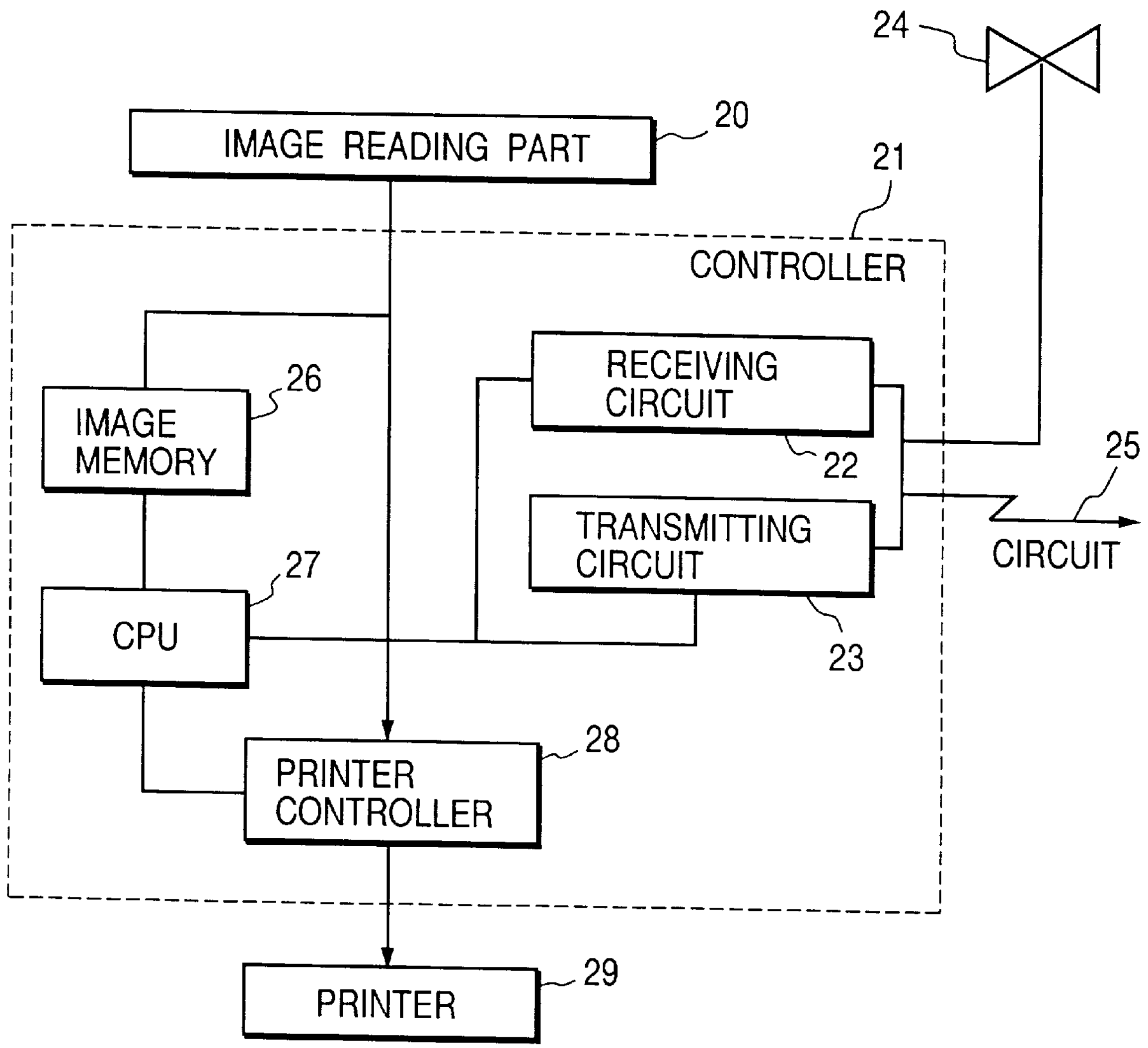
FIG. 6 is a block diagram in a case where the image forming apparatus is used as a printer of a facsimile system.

When the image forming apparatus of the present invention as described above is used as a printer of a facsimile machine, the photoimagewise exposing light L serves as exposing light used for the printing of received data. FIG. 6 illustrates an example in such a case with a block diagram.

A controller 21 controls an image reading part 20 and a printer 29. The whole of the controller 21 is controlled by CPU 27. Image data outputted from the image reading part are sent to the other facsimile station through a transmitting circuit 23. Data received from the other station is sent to a printer 29 through a receiving circuit 22. Stated image data are stored in an image memory 26. A printer controller 28 controls the printer 29. The numeral 24 denotes a telephone.

Images received from a circuit 25 (image information from a remote terminal connected through the circuit) are demodulated in the receiving circuit 22, and then successively stored in an image memory 26 after the image information is decoded by the CPU 27. Then, when images for at least one page have been stored in the memory 26, the image recording for that page is performed. The CPU 27 reads out the image information for one page from the memory 26 and sends the coded image information for one page to the printer controller 28. The printer controller 28, having received the image information for one page from the CPU 27, controls the printer 29 so that the image information for one page is recorded.

The CPU 27 receives image information for next page in the course of the recording by the printer 29.

Images are received and recorded in the manner as described above.

The developer (toner) used in the present invention to make a visible image from the electrostatic latent image will be described below.

Toners to be contained in developers are roughly grouped into dry process toners and wet process toners. The wet process toners cause the evaporation of solvents. Hence, at present, the dry process toners are prevailing. Toner is a fine powder chiefly produced by melt-kneading materials such as a binder resin for toner, a release agent, a charge control agent and a colorant, and cooling the kneaded product to solidify, followed by pulverization and further followed by classification to make particle size distribution uniform.

The toner binder resin used in the toner may include, for example, styrene, homopolymers of styrene or derivatives thereof such as α-methylstyrene and p-chlorostyrene; styrene copolymers such as a styrene-propylene copolymer, a styrene-vinyltoluene copolymer, a styrene-ethyl acrylate copolymer, a styrene-butyl acrylate copolymer, a styrene-octyl acrylate copolymer, a styrene-dimethylaminoethyl copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-methyl vinyl ether copolymer, a styrene-methyl vinyl ketone copolymer, a styrene-butadiene copolymer, a styrene-isoprene copolymer, a styrene-maleic acid copolymer, and a styrene-maleic acid ester copolymer; polymethyl methacrylate; polybutyl methacrylate; polyvinyl acetate; polyethylene; polypropylene; polyvinyl butyral; polyacrylic resins; rosin; modified rosins; terpene resins; phenol resins; aliphatic or alicyclic hydrocarbon resins; aromatic petroleum resins; paraffin wax; and carnauba wax. Any of these may be used alone or in the form of a mixture.

When the toner is used as a color toner (a non-magnetic toner), a dye or pigment may be contained as a colorant in the toner. The dye or pigment may include, for example, carbon black, Nigrosine dyes, lamp black, Sudan Black SM, Fast Yellow G, Benzidine Yellow, Pigment Yellow, Indian First Orange, Irgazine Red, Para Nitraniline Red, Toluidine Red, Carmine 6B, Permanent Bordeaux F3R, Pigment Orange R, Lithol Red 2G, Lake Red 2G, Rhodamine FB, Rhodamine B Lake, Methyl Violet B lake, Phthalocyanine Blue, Pigment Blue, Brilliant Green B, Phthalocyanine Green, Oil Yellow GG, Zapon First Yellow CGG, Kayaset Y963, Kayaset YG, Zapon First Orange RR, Oil Scarlet, Aurazole Brown B, Zapon First Scarlet CG, and Oil Pink OP. Any of these may be used under appropriate selection.

When the toner is used as a magnetic toner, a magnetic powder is incorporated in the toner. As the magnetic powder, a material magnetizable when placed in a magnetic field is used. Such material may include, for example, powders of ferromagnetic metals such as iron, cobalt and nickel; and alloys or compounds such as magnetite, hematite and ferrite. Such a magnetic powder may preferably be in a content of approximately from 15 to 70% by weight based on the weight of the toner.

In some cases, various types of release agent may be added and incorporated in the toner. Such release agents may include polyfluoroethylene, fluorine resins, fluorocarbon oil, silicone oil, low-molecular weight polyethylene, low-molecular weight polypropylene and various types of waxes.

In the present invention, various types of charge control agent may be optionally added in order for the toner to be easily charged positively or negatively.

In order to make the developer carrying member of the present invention more effective, it is preferable to use a developer having a negatively chargeable toner.

In the present invention, the non-magnetic toner described above may be blended with a carrier to be used as a two-component type developer, or may be used alone as a one-component type developer.

The toner contained in the developer used in the present invention may preferably have a weight average particle diameter (D4) of from 3 μm to 13 μm, and more preferably from 3.5 μm to 10 μm, in view of image quality such as image density or character line sharpness. If the toner has a weight average particle diameter (D4) larger than 13 μm, the character line sharpness tends to lower, and if smaller than 3 μm, it is difficult to attain a high image density.

Physical properties concerned with the present invention are measured by the methods as described below.

(1) Measurement of Center-line Average Roughness (Ra):

In accordance with the surface roughness in JIS BO601, values at six points each of (axial-direction three points)×(peripheral-direction two points) are measured using Surfcoader SE-3300, manufactured by Kosaka Kenkyusho, and their average value is calculated.

(2) Measurement of Volume Resistivity of Particles:

Sample particles are put in an aluminum ring of 40 mm diameter, and press-molded under 2,500 N to measure the volume resistivity of the molded product by means of a resistivity meter LOW-RESTAR or HI-RESTAR (both manufactured by Mitsubishi Petrochemical Engineering Co., Ltd.), using a four-terminal probe. The measurement is made in an environment of 20 to 25° C. and 50 to 60% RH.

(3) Measurement of Volume Resistivity of Coat Layer:

A coat layer of 7 to 20 μm thick is formed on a PET sheet of 100 μm thick, and its resistivity is measured using a voltage drop type digital ohmmeter (manufactured by Kawaguchi Denki Seisakusho), which is in conformity with the ASTM standard (D-991-82) and the Japan Rubber Association standard SRIS (2301-1969), used for measuring volume resistivity of conductive rubbers and plastics, and provided with an electrode of a four-terminal structure. The measurement is made in an environment of 20 to 25° C. and 50 to 60% RH.

(4) Measurement of True Density of Spherical Particles:

True density of the conductive spherical particles used in the present invention is measured using a dry densitometer ACUPIC 1330 (manufactured by Shimadzu Corporation).

(5) Measurement of Particle Diameter of Spherical Particles:

Measured using a Coulter Model LS-130 particle size distribution meter (manufactured by Coulter Electronics Inc.), which is a laser diffraction particle size distribution meter. As a measuring method, an aqueous module is used. As a measuring solvent, pure water is used. The inside of a measuring system of a particle size distribution meter is washed with the pure water for about 5 minutes, and 10 to 25 mg of sodium sulfite as an anti-foaming agent is added in the measuring system to carry out background function.

Next, three or four drops of a surface active agent are added in 10 ml of pure water, and 5 to 25 mg of a measuring sample is further added. The aqueous solution in which the sample has been suspended is subjected to dispersion by means of an ultrasonic dispersion machine for about 1 to 3 minutes to obtain a sample fluid. The sample fluid is little by little added in the measuring system of the above measuring device, and the sample concentration in the measuring system is adjusted so as to be 45 to 55% as PIDS on the screen of the device to make measurement. Then, number average particle diameter calculated from number distribution is determined.

(6) Measurement of Particle Diameter of Conductive Fine Particles:

Particle diameters of conductive fine particles are measured using an electron microscope. A photograph is taken at 60,000 magnifications. If it is difficult to do so, a photograph taken at a lower magnification is enlarged so as to be 60,000 magnifications. On the photograph, particle diameters of primary particles are measured. Here, major axes and minor axes are measured, and a value obtained by averaging the measurements is regarded as particle diameter. This is measured on 100 samples, and a 50% value of the measurements is regarded as average particle diameter.

(7) Measurement of Particle Diameter of Toner:

Measured using Coulter Multisizer (manufactured by Coulter Electronics, Inc.). As an electrolytic solution, an aqueous 1% NaCl solution is prepared using first-grade sodium chloride. For example, ISOTON R-II (Coulter Scientific Japan Co.) may be used. Measurement is carried out by adding as a dispersant from 0.1 to 5 ml of a surface active agent, preferably an alkylbenzene sulfonate, to from 100 to 150 ml of the above aqueous electrolytic solution, and further adding from 2 to 20 mg of a sample to be measured. The electrolytic solution in which the sample has been suspended is subjected to dispersion for about 1 minute to about 3 minutes in an ultrasonic dispersion machine. The volume distribution and number distribution are calculated by measuring the volume and number of toner particles with diameters of not smaller than 2 μm by means of the above measuring device, using an aperture of 100 μm as its aperture. Then the value according to the present invention is determined which is the weight-based, weight average particle diameter (D4: the middle value of each channel is used as the representative value for each channel) determined from volume distribution.

(8) Measurement of Triboelectric Characteristics of Toner:

Toner carried on a developing sleeve is collected by suction using a metal cylinder and a cylindrical filter. Quantity Q of electric charges accumulated in a capacitor through the metal cylinder when collected is determined and quantity Q/M of electric charges per unit weight is determined from weight M of the toner collected, to make measurement of triboelectric characteristics of the toner.

The present invention makes it possible to more improve rapid and uniform chargeability to toner and also to more improve running performance, than developer carrying members conventionally used, and hence makes it possible to keep the condition in which good images can be provided over a long period of time.

Thus, according to the present invention, the coat layer on the surface of the developer carrying member may hardly wear and cause deterioration such as toner contamination as a result of repeated copying or running. On account of such a highly durable developer carrying member, high-grade images free of decrease in image density and occurrence of sleeve ghost and fog and having a good character line sharpness can be provided over a long period of time.

EXAMPLES

The present invention will be described below in greater detail by giving Examples and Comparative Examples. The following Examples by no means limit the present invention. In the following Examples and Comparative Examples, all "%" and "part(s)" are by weight unless particularly noted.

Example 1

On 100 parts of spherical phenol resin particles with a number average particle diameter of 7.8 μm, 14 parts of coal bulk-mesophase pitch powder with a number average particle diameter of 2 μm or smaller was uniformly applied by means of an automated mortar (manufactured by Ishikawa Kogyo). Thereafter, the coated particles were subjected to thermal stabilization treatment at 280° C. in the air, followed by firing at 2,000° C. in an atmosphere of nitrogen to graphitize them, and further followed by classification to produce spherical, conductive carbon particles with a number average particle diameter of 7.2 μm, which were used as the conductive spherical particles (conductive spherical particles A-1). Physical properties of the conductive spherical particles A-1 are shown in Table 1.

As the nitrogen-containing heterocyclic compound, particles of an imidazole compound represented by Formula B-1 (nitrogen-containing heterocyclic compound B-1 or particles B-1), having a number average particle diameter of 3 μm were used.

(B-1)

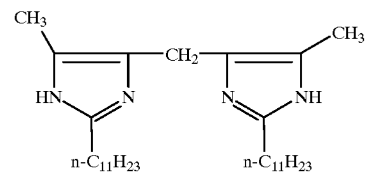

| | |
|---|---|
| Resol type phenol resin solution (containing 50% of methanol) | 200 parts |
| Conductive spherical particles A-1 | 7 parts |
| Nitrogen-containing heterocyclic compound B-1 (imidazole compound particles) | 20 parts |
| Graphite particles with number average particle diameter of 3.4 μm | 50 parts |
| Conductive carbon black | 5 parts |
| Isopropyl alcohol | 280 parts |

The above materials were dispersed by means of a sand mill in the following way. First, the resol type phenol resin solution (containing 50% of methanol) was diluted with a portion of the isopropyl alcohol. Next, to the resulting solution, the conductive carbon black, the graphite particles with a number average particle diameter of 3.4 μm and the nitrogen-containing heterocyclic compound B-1 were added, followed by dispersion by means of a sand mill using glass beads of 1 mm diameter as media particles. To the dispersion obtained, the conductive spherical particles A-1 having been dispersed in the remaining isopropyl alcohol were added, and the mixture obtained was further dispersed to obtain a coating fluid.

Using this coating fluid, a conductive coat layer was formed by spraying on a cylinder of 16 mm in external diameter, made of aluminum. Subsequently, the coated cylinder was heated at 150° C. for 30 minutes by means of a hot air drying oven to cause the conductive coat layer to cure. Thus, developer carrying member C-1 was produced. Physical properties of the conductive coat layer of this developer carrying member C-1 are shown in Table 2.

The C-1 developer carrying member was used in a laser beam printer LBP450 (manufactured by CANON INC.) as the image forming apparatus shown in FIG. 4, having the developing assembly shown in FIG. 3. Using this apparatus, a running evaluation test was made for the developer carrying member while feeding a one-component type developer.

| The following was used as the one-component type developer. | |
|---|---|
| Styrene-acrylic resin | 100 parts |
| Magnetite | 100 parts |

-continued

| The following was used as the one-component type developer. | |
|---|---|
| Chromium complex of 3,5-di-tert-butylsalicylic acid | 1 part |
| Low-molecular weight polypropylene | 5 parts |

Using the above materials, kneading, pulverization and classification were carried out by a dry toner production process commonly used, obtaining a negatively chargeable fine powder (magnetic toner particles) with a number average particle diameter of 5.8 μm. To 100 parts of this fine powder, 1.0 part of hydrophobic colloidal silica was externally added to produce a negatively chargeable magnetic toner. This negatively chargeable magnetic toner was used as the one-component type developer.

The image forming apparatus used in the present Example has a constitution as shown in FIG. 5 in which the process cartridge comprised of the latent image bearing member, the developing means, the cleaning means and the primary charging means which are joined into one unit as a cartridge are detachably mounted to the body of the image forming apparatus.

Example 2

The same procedures as in Example 1 were repeated except that the nitrogen-containing heterocyclic compound B-1 used in the coating fluid of Example 1 was changed in its amount from 20 parts to 4 parts, to produce developer carrying member C-2. Physical properties of the conductive coat layer of this developer carrying member C-2 are shown in Table 2.

The C-2 developer carrying member was used in the same image forming apparatus as in Example 1. In the same manner as in Example 1, a running evaluation test was made for this developer carrying member while feeding the one-component type developer.

Example 3

The same procedures as in Example 1 were repeated except that the nitrogen-containing heterocyclic compound B-1 used in the coating fluid of Example 1 was changed in its amount from 20 parts to 40 parts, to produce developer carrying member C-3. Physical properties of the conductive coat layer of this developer carrying member C-3 are shown in Table 2.

The C-3 developer carrying member was used in the same image forming apparatus as in Example 1. In the same manner as in Example 1, a running evaluation test was made for this developer carrying member while feeding the one-component type developer.

Example 4

On 100 parts of spherical phenol resin particles with a number average particle diameter of 5.1 μm, 14 parts of coal bulk-mesophase pitch powder with a number average particle diameter of 1.4 μm or smaller was uniformly applied by means of an automated mortar (manufactured by Ishikawa Kogyo). Thereafter, the coated particles were subjected to thermal stabilization treatment at 280° C. in the air, followed by firing at 2,000° C. in an atmosphere of nitrogen to graphitize them, and further followed by classification to produce spherical, conductive carbon particles with a number average particle diameter of 3.8 μm, which were used as the conductive spherical particles (conductive spherical particles A-2). Physical properties of the conductive spherical particles A-2 are shown in Table 1.

The subsequent procedures in Example 1 were repeated except that the conductive spherical particles A-1 added in an amount of 7 parts, used in the coating fluid of Example 1, were replaced with 12.5 parts of the conductive spherical particles A-2, to produce developer carrying member C-4. Physical properties of the conductive coat layer of this developer carrying member C-4 are shown in Table 2.

The C-4 developer carrying member was used in the same image forming apparatus as in Example 1. In the same manner as in Example 1, a running evaluation test was made for this developer carrying member while feeding the one-component type developer.

Example 5

On 100 parts of spherical phenol resin particles with a number average particle diameter of 19.5 μm, 14 parts of coal bulk-mesophase pitch powder with a number average particle diameter of 1.4 μpm or smaller was uniformly applied by means of an automated mortar (manufactured by Ishikawa Kogyo). Thereafter, the coated particles were subjected to thermal stabilization treatment at 280° C. in the air, followed by firing at 2,000° C. in an atmosphere of nitrogen to graphitize them, and further followed by classification to produce spherical, conductive carbon particles with a number average particle diameter of 19.8 pm, which were used as the conductive spherical particles (conductive spherical particles A-3). Physical properties of the conductive spherical particles A-3 are shown in Table 1.

The subsequent: procedures in Example 1 were repeated except that the conductive spherical particles A-1 added in an amount of 7 parts, used in the coating fluid of Example 1, were replaced with 2.5 parts of the conductive spherical particles A-3, to produce developer carrying member C-5. Physical properties of the conductive coat layer of this developer carrying member C-5 are shown in Table 2.

The C-5 developer carrying member was used in the same image forming apparatus as in Example 1. In the same manner as in Example 1, a running evaluation test was made for this developer carrying member while feeding the one-component type developer.

Example 6

On 100 parts of spherical phenol resin particles with a number average particle diameter of 7.5 μpm, 14 parts of coal bulk-mesophase pitch powder with a number average particle diameter of 1.4 μpm or smaller was uniformly applied by means of an automated mortar (manufactured by Ishikawa Kogyo). Thereafter, the coated particles were subjected to thermal stabilization treatment at 280° C. in the air, followed by firing at 2,000° C. in an atmosphere of nitrogen to graphitize them, and further followed by classification to produce spherical, conductive carbon particles with a number average particle diameter of 7.5 pm, which were used as the conductive spherical particles (conductive spherical particles A-4). Physical properties of the conductive spherical particles A-4 are shown in Table 1.

The subsequent procedures in Example 1 were repeated except that the conductive spherical particles A-1 added in an amount of 7 parts, used in the coating fluid of Example 1, were replaced with 7 parts of the conductive spherical particles A-4, to produce developer carrying member C-6. Physical properties of the conductive coat layer of this developer carrying member C-6 are shown in Table 2.

The C-6 developer carrying member was used in the same image forming apparatus as in Example 1. In the same manner as in Example 1, a running evaluation test was made for this developer carrying member while feeding the one-component type developer.

Example 7

The A-4 particles used in Example 6 were plated with copper and silver to produce metal-coated carbon particles with a number average particle diameter of 8.3 μm, which were used as the conductive spherical particles (conductive spherical particles A-5). Physical properties of the conductive spherical particles A-5 are shown in Table 1.

The subsequent procedures in Example 1 were repeated except that the conductive spherical particles A-1 added in an amount of 7 parts, used in the coating fluid of Example 1, were replaced with 7 parts of the conductive spherical particles A-5, to produce developer carrying member C-7. Physical properties of the conductive coat layer of this developer carrying member C-7 are shown in Table 2.

The C-7 developer carrying member was used in the same image forming apparatus as in Example 1. In the same manner as in Example 1, a running evaluation test was made for this developer carrying member while feeding the one-component type developer.

Example 8

Using the materials shown below, kneading, pulverization and classification were carried out, obtaining conductive particles with a number average particle diameter of 7.5 μm. Thereafter, the particles were made spherical by means of a hybridizer (manufactured by Nera Kikai) to produce conductive spherical resin particles, which were used as the conductive spherical particles (conductive spherical particles A-6). Physical properties of the conductive spherical particles A-6 are shown in Table 1.

| | |
|---|---|
| Styrene-acrylate resin | 100 parts |
| Conductive carbon black | 25 parts |

The subsequent procedures in Example 1 were repeated except that the conductive spherical particles A-1 added in an amount of 7 parts, used in the coating fluid of Example 1, were replaced with 7 parts of the conductive spherical particles A-6, to produce developer carrying member C-8. Physical properties of the conductive coat layer of this developer carrying member C-8 are shown in Table 2.

The C-8 developer carrying member was used in the same image forming apparatus as in Example 1. In the same manner as in Example 1, a running evaluation test was made for this developer carrying member while feeding the one-component type developer.

Example 9

As the nitrogen-containing heterocyclic compound, particles of an imidazole compound represented by Formula B-2 (particles B-2), having a number average particle diameter of 5 μm were used.

(B-2)

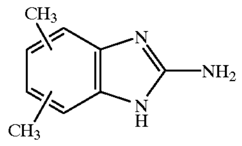

The subsequent procedures in Example 1 were repeated except that the addition of the nitrogen-containing heterocyclic compound B-1 used in the coating fluid of Example 1 was replaced with the addition of B-2 to produce developer carrying member C-9. Physical properties of the conductive coat layer of this developer carrying member C-9 are shown in Table 2.

The C-9 developer carrying member was used in the same image forming apparatus as in Example 1. In the same manner as in Example 1, a running evaluation test was made for this developer carrying member while feeding the one-component type developer.

Example 10

As the nitrogen-containing heterocyclic compound, particles of an imidazole compound represented by Formula B-3 (particles B-3), having a number average particle diameter of 1.5 μm were used.

(B-3)

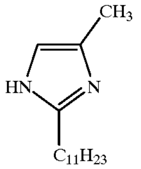

The subsequent procedures in Example 1 were repeated except that the addition of the nitrogen-containing heterocyclic compound B-1 used in the coating fluid of Example 1 was replaced with the addition of B-3 to produce developer carrying member C-10. Physical properties of the conductive coat layer of this developer carrying member C-10 are shown in Table 2.

The C-10 developer carrying member was used in the same image forming apparatus as in Example 1. In the same manner as in Example 1, a running evaluation test was made for this developer carrying member while feeding the one-component type developer.

Example 11

As the nitrogen-containing heterocyclic compound, particles of an imidazole compound represented by Formula B-4 (particles B-4), having a number average particle diameter of 1.5 μm were used.

(B-4)

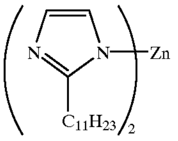

The subsequent procedures in Example 1 were repeated except that the addition of the nitrogen-containing heterocyclic compound B-1 used in the coating fluid of Example 1 was replaced with the addition of B-4 to produce developer carrying member C-11. Physical properties of the conductive coat layer of this developer carrying member C-11 are shown in Table 2.

The C-11 developer carrying member was used in the same image forming apparatus as in Example 1. In the same manner as in Example 1, a running evaluation test was made for this developer carrying member while feeding the one-component type developer.

Example 12

As the nitrogen-containing heterocyclic compound, particles of an imidazole compound represented by Formula B-5 (particles B-5), having a number average particle diameter of 3.4 μm were used.

(B-5)

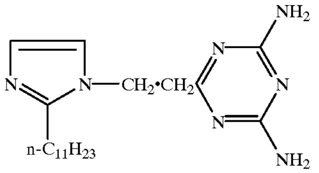

The subsequent procedures in Example 1 were repeated except thali the addition of the nitrogen-containing heterocyclic compound B-1 used in the coating fluid of Example 1 was replaced with the addition of B-5 to produce developer carrying member C-12. Physical properties of the conductive coat layer of this developer carrying member C-12 are shown in Table 2.

The C-12 developer carrying member was used in the same image forming apparatus as in Example 1. In the same manner as in Example 1, a running evaluation test was made for this developer carrying member while feeding the one-component type developer.

Example 13

As the nitrogen-containing heterocyclic compound, particles of an imidazole compound represented by Formula B-6 (particles B-6), having a number average particle diameter of 2.1 μm were used.

(B-6)

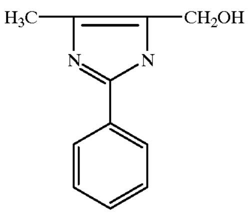

The subsequent procedures in Example 1 were repeated except that the addition of the nitrogen-containing heterocyclic compound B-1 used in the coating fluid of Example 1 was replaced with the addition of B-6 to produce developer carrying member C-13. Physical properties of the conductive coat layer of this developer carrying member C-13 are shown in Table 2.

The C-13 developer carrying member was used in the same image forming apparatus as in Example 1. In the same manner as in Example 1, a running evaluation test was made for this developer carrying member while feeding the one-component type developer.

Example 14

As the nitrogen-containing heterocyclic compound, particles of a Nigrosine dye containing an oxazine ring compound and an azine ring compound (particles B-7), having a number average particle diameter of 2.1 μm were used.

The subsequent procedures in Example 1 were repeated except that the addition of the nitrogen-containing heterocyclic compound B-1 used in the coating fluid of Example 1 was replaced with the addition of B-7 to produce developer carrying member C-14. Physical properties of the conductive coat layer of this developer carrying member C-14 are shown in Table 2.

The C-14 developer carrying member was used in the same image forming apparatus as in Example 1. In the same manner as in Example 1, a running evaluation test was made for this developer carrying member while feeding the one-component type developer.

Example 15

| | |
|---|---|
| Resol type phenol resin solution (containing 50% of methanol) | 200 parts |
| Conductive spherical particles A-1 | 10 parts |
| Nitrogen-containing heterocyclic compound B-1 (imidazole compound particles) | 15 parts |
| Conductive carbon black | 30 parts |
| Isopropyl alcohol | 230 parts |

Using the above materials, the same procedures as in Example 1 were repeated to prepare a coating fluid and to produce developer carrying member C-15. Physical properties of the conductive coat layer of this developer carrying member C-15 are shown in Table 2.

The C-15 developer carrying member was used in the same image forming apparatus as in Example 1. In the same manner as in Example 1, a running evaluation test was made for this developer carrying member while feeding the one-component type developer.

Example 16

| | |
|---|---|
| Resol type phenol resin solution (containing 50% of methanol) | 200 parts |
| Conductive spherical particles A-2 | 10 parts |
| Nitrogen-containing heterocyclic compound B-1 (imidazole compound particles) | 15 parts |
| Graphite particles with a number average particle diameter of 1.4 μm | 50 parts |
| Conductive carbon black | 5 parts |
| Isopropyl alcohol | 290 parts |

Using the above materials, the same procedures as in Example 1 was repeated to prepare a coating fluid.

Using this coating fluid, a conductive coat layer was formed by spraying on a cylinder of 32 mm in external diameter, made of aluminum. Subsequently, the coated cylinder was heated at 150° C. for 30 minutes by means of a hot air drying oven to cause the conductive coat layer to cure. Thus, developer carrying member C-16 was produced. Physical properties of the conductive coat layer of this developer carrying member C-16 are shown in Table 2.

The C-16 developer carrying member was used in an image forming apparatus NP6060 (manufactured by CANON INC.) as the image forming apparatus shown in FIG. 4 (corona charging means, corona transfer means), having the developing assembly shown in FIG. 1. Using this apparatus, a running evaluation test was made for the developer carrying member while feeding a one-component type developer.

| The following was used as the one-component type developer. | |
|---|---|
| Polyester resin | 100 parts |
| Magnetite | 100 parts |
| Chromium complex of 3,5-di-tert-butylsalicylic acid | 1 part |
| Low-molecular weight polypropylene | 4 parts |

Using the above materials, kneading, pulverization and classification were carried out by a dry toner production process commonly used, obtaining a negatively chargeable fine powder (magnetic toner particles) with a number average particle diameter of 6.4 μm. To 100 parts of this fine powder, 1.1 parts of hydrophobic colloidal silica was externally added, obtaining a negatively chargeable magnetic toner. This negatively chargeable magnetic toner was used as the one-component type developer.

Example 17

Developer carrying member C-17 was prepared in the same manner as in Example 1 except that the amount of the nitrogen-containing heterocyclic compound B-1 used for the coating fluid in Example 1 was changed from 20 parts to 2.2 parts. The physical properties of the conductive coat layer of this developer carrying member C-17 are shown in Table 2.

By the use of the developer carrying member in the same image forming apparatus as in Example 1, a running evaluation test was applied to the developer carrying member in the same manner as in Example 1 while supplying the one-component type developer.

Comparative Example 1

The same procedures as in Example 1 were repeated except that the conductive spherical particles A-1 were replaced with amorphous graphite particles a-1 shown in Table 1, having a number average particle diameter of 9.2 μm, to prepare a coating fluid and to produce developer carrying member D-1. Physical properties of the conductive coat layer of this developer carrying member D-1 are shown in Table 2.

The D-1 developer carrying member was used in the same image forming apparatus as in Example 1. In the same manner as in Example 1, a running evaluation test was made for the developer carrying member while feeding the one component type developer.

Comparative Example 2

The same procedures as in Example 1 were repeated except that the conductive spherical particles A-1 were replaced with non-conductive spherical PMMA resin particles a-2 shown in Table 1, having a number average particle diameter of 7.5 μm, to prepare a coating fluid and to produce developer carrying member D-2. Physical properties of the conductive coat layer of this developer carrying member D-2 are shown in Table 2.

The D-2 developer carrying member was used in the same image forming apparatus as in Example 1. In the same manner as in Example 1, a running evaluation test was made for the developer carrying member while feeding the one component type developer.

Comparative Example 3

Using the materials shown below, kneading, pulverization and classification were carried out to produce conductive amorphous particles a-3 shown in Table 1, having a number average particle diameter of 7.8 μm.

| | |
|---|---|
| Styrene-acrylate resin | 100 parts |
| Conductive carbon black | 25 parts |

The same procedures as in Example 1 were repeated except that the conductive spherical particles A-1 were replaced with the particles a-3, to prepare a coating fluid and to produce developer carrying member D-3. Physical properties of the conductive coat layer of this developer carrying member D-3 are shown in Table 2.

The D-3 developer carrying member was used in the same image forming apparatus as in Example 1. In the same manner as in Example 1, a running evaluation test was made for the developer carrying member while feeding the one component type developer.

Comparative Example 4

The A-4 particles used in Example 6 were plated with copper and silver to produce metal-coated carbon particles with a number average particle diameter of 9.5 μm, which were used as the conductive spherical particles (conductive spherical particles a-4). Physical properties of the conductive spherical particles a-4 are shown in Table 1. As shown therein, the true density of the conductive spherical particles a-4 was 3.2 g/cm$^3$.

The subsequent procedures in Example 1 were repeated except that the conductive spherical particles A-1 added in an amount of 7 parts, used in the coating fluid of Example 1, were replaced with 7 parts of the conductive spherical particles a-4, to produce developer carrying member D-4. Physical properties of the conductive coat layer of this developer carrying member D-4 are shown in Table 2.

The D-4 developer carrying member was used in the same image forming apparatus as in Example 1. In the same manner as in Example 1, a running evaluation test was made for this developer carrying member while feeding the one-component type developer.

Comparative Example 5

| | |
|---|---|
| Resol type phenol resin solution (containing 50% of methanol) | 200 parts |
| Conductive spherical particles A-1 | 7 parts |
| Graphite particles with a number average particle diameter of 3.4 μm | 50 parts |
| Conductive carbon black | 5 parts |
| Isopropyl alcohol | 240 parts |

Using the above materials, the same procedures as in Example 1 were repeated to prepare a coating fluid and to produce developer carrying member D-5. Physical properties of the conductive coat layer of this developer carrying member D-5 are shown in Table 2.

The D-5 developer carrying member was used in the same image forming apparatus as in Example 1. In the same manner as in Example 1, a running evaluation test was made for the developer carrying member while feeding the one component type developer.

Comparative Example 6

The same procedures as in Example 1 were repeated to produce developer carrying member D-6, except that the addition of the nitrogen-containing heterocyclic compound B-1 used in the coating fluid of Example 1 was replaced with the addition of particles of a quaternary ammonium salt represented by Formula b-1 containing no nitrogen-containing heterocyclic ring (particles b-1), having a number average particle diameter of 2.2 μm.

(b-1)

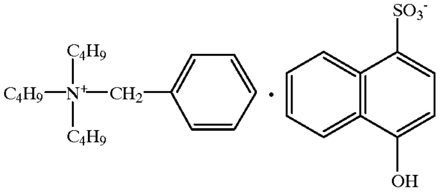

Physical properties of the conductive coat layer of this developer carrying member D-6 are shown in Table 2.

The D-6 developer carrying member was used in the same image forming apparatus as in Example 1. In the same manner as in Example 1, a running evaluation test was made for this developer carrying member while feeding the one-component type developer.

Comparative Example 7

The same procedures as in Example 1 were repeated developer carrying member D-7, except that the addition of the nitrogen-containing heterocyclic compound B-1 used in the coating fluid of Example 1 was replaced with the addition of particles of a triphenylmethane represented by Formula b-2 containing no nitrogen-containing heterocyclic ring (particles b-2), having a number average particle diameter of 1.8 μm.

Physical properties of the conductive coat layer of this developer carrying member D-7 are shown in Table 2.

The D-7 developer carrying member was used in the same image forming apparatus as in Example 1. In the same manner as in Example 1, a running evaluation test was made for this developer carrying member while feeding the one-component type developer.

Comparative Example 8

The same procedures as in Example 16 were repeated except that the conductive spherical particles A-1 were replaced with amorphous graphite particles a-5 shown in Table 1, having a number average particle diameter of 4.1 μm, to prepare a coating fluid and to produce developer carrying member D-8. Physical properties of the conductive coat layer of this developer carrying member D-8 are shown in Table 2.

The D-8 developer carrying member was used in the same image forming apparatus as in Example 16. In the same manner as in Example 16, a running evaluation test was made for the developer carrying member while feeding the one component type developer.

TABLE 1

Physical Properties of Particles Added to Constitute Conductive Coat Layer

| Particles | Constitution | (1) (μm) | True density ($g/cm^3$) | Volume resistivity (Ω·cm) | Shape (axis ratio)* |
|---|---|---|---|---|---|
| A-1 | Carbon particles | 7.2 | 1.48 | $8.5 \times 10^{-2}$ | Spherical (1.15) |
| A-2 | Carbon particles | 3.8 | 1.51 | $8.1 \times 10^{-2}$ | Spherical (1.16) |
| A-3 | Carbon particles | 19.8 | 1.47 | $8.9 \times 10^{-2}$ | Spherical (1.14) |
| A-4 | Carbon particles | 7.5 | 1.42 | $2.5 \times 10^{-1}$ | Spherical (1.12) |
| A-5 | Carbon particles plated with Cu & Ag | 8.3 | 2.52 | $3.4 \times 10^{-5}$ | Spherical (1.06) |

(b-2)

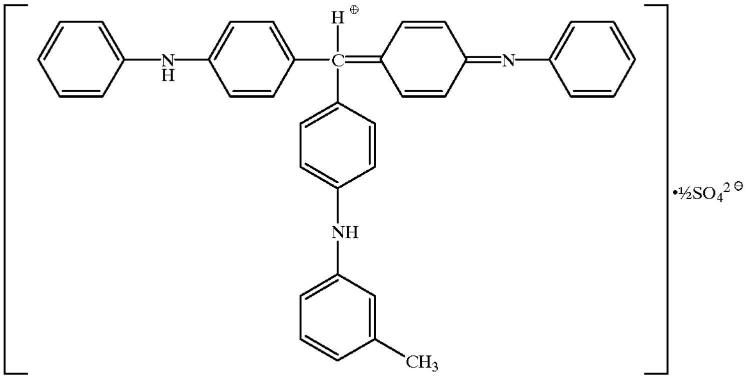

TABLE 1-continued

Physical Properties of Particles Added to Constitute Conductive Coat Layer

| Particles | Constitution | (1) (μm) | True density (g/cm³) | Volume resistivity (Ω·cm) | Shape (axis ratio)* |
|---|---|---|---|---|---|
| A-6 | Carbon black = dispersed resin particles | 7.4 | 1.21 | $2.1 \times 10^{1}$ | Spherical (1.23) |
| a-1 | Graphite particles | 9.2 | 2.25 | $3.5 \times 10^{-2}$ | Amorphous (2.21) |
| a-2 | PMMA particles | 7.5 | 1.19 | $\geqq 10^{15}$ | Spherical (1.06) |
| a-3 | Carbon black = dispersed resin particles | 7.8 | 1.21 | $1.6 \times 10^{1}$ | Amorphous (1.54) |
| a-4 | Carbon particles plated with Cu & Ag | 9.4 | 3.20 | $1.9 \times 10^{-5}$ | Spherical (1.05) |
| a-5 | Graphite particles | 4.1 | 2.21 | $3.5 \times 10^{-2}$ | Amorphous (1.98) |

(1): Number average particle diameter
* (major/minor axis ratio)

TABLE 2

Physical Properties of Coat Layer of Developer Carrying Member

| Developer carrying member | Particles added in conductive coat layer A,a | B,b | Conductive coat layer coating thickness (μm) | Ra (μm) | Volume resistivity (Ω·cm) |
|---|---|---|---|---|---|
| C-1 | A-1 | B-1 | 9 | 1.53 | 1.2 |
| C-2 | A-1 | B-1 | 9 | 1.41 | $8.6 \times 10^{-1}$ |
| C-3 | A-1 | B-1 | 9 | 1.59 | 7.5 |
| C-4 | A-2 | B-1 | 9 | 1.23 | $9.8 \times 10^{-1}$ |
| C-5 | A-3 | B-1 | 9 | 1.68 | 1.3 |
| C-6 | A-4 | B-1 | 9 | 1.56 | 1.3 |
| C-7 | A-5 | B-1 | 9 | 1.58 | $4.9 \times 10^{-1}$ |
| C-8 | A-6 | B-1 | 9 | 1.54 | 1.4 |
| C-9 | A-1 | B-2 | 9 | 1.57 | 1.2 |
| C-10 | A-1 | B-3 | 9 | 1.45 | 1.2 |
| C-11 | A-1 | B-4 | 9 | 1.42 | 1.2 |
| C-12 | A-1 | B-5 | 9 | 1.50 | 1.3 |
| C-13 | A-1 | B-6 | 9 | 1.46 | 1.2 |
| C-14 | A-1 | B-7 | 9 | 1.53 | 1.1 |
| C-15 | A-1 | B-1 | 9 | 1.20 | 9.3 |
| C-16 | A-2 | B-1 | 12 | 0.95 | $9.6 \times 10^{-1}$ |
| C-17 | A-1 | B-1 | 9 | 1.38 | $7.4 \times 10^{-1}$ |
| D-1 | a-1 | B-1 | 9 | 1.65 | 1.1 |
| D-2 | a-2 | B-1 | 9 | 1.55 | 1.4 |
| D-3 | a-3 | B-1 | 9 | 1.60 | 1.3 |
| D-4 | a-4 | B-1 | 9 | 1.68 | $7.2 \times 10^{-1}$ |
| D-5 | A-1 | # | 9 | 1.43 | $8.9 \times 10^{-1}$ |
| D-6 | A-1 | b-1 | 9 | 1.41 | 1.1 |
| D-7 | A-1 | b-2 | 9 | 1.56 | 1.2 |
| D-8 | a-5 | B-1 | 12 | 0.98 | $8.9 \times 10^{-1}$ |

Evaluation

Running tests were carried out with respect to the following evaluation items to evaluate the developer carrying members produced in Examples and Comparative Examples. Results of evaluation on the permanence of image density, running fog and running ghost in an environment of low temperature and low humidity are shown in Table 3. Results of the evaluation on the permanence of image density, the permanence of character line sharpness, running fog and running ghost in an environment of high temperature and high humidity are shown in Table 4. In order to evaluate the permanence of a rise in toner charging (or the quick electrification of toner) attributable to the developer carrying members in a high temperature and high humidity environment, the running was stopped for 5 days after running for a given number of sheets, and then, further continued to evaluate the permanence of image density, the permanence of character line sharpness, running fog and running ghost.

Results of evaluation on wear resistance and anti-contamination properties are shown in Table 5.

Running tests were carried out in two environments, i.e., low temperature and low humidity (L/L) and high temperature and high humidity (H/H). Specifically, an environment of 15° C./10% RH as the low temperature and low humidity (L/L) and an environment of 32.5° C./85% RH as the high temperature and high humidity (H/H).

Evaluation Methods (1) Image Density:

To evaluate the image density, the density of a solid black areas to which solid print was applied was measured at 5 points using a reflection densitometer RD918 (manufactured by Macbeth Co.), and the average of them was regarded as the image density.

(2) Fog Density:

Reflectance (D1) at solid white areas on recording paper on which images were formed was measured, and reflectance (D2) on unused recording paper of the same cut as the recording paper used in image formation was also measured. A value of D1–D2 was found out at 5 points, and the average of them was regarded as the fog density. The reflectance was measured using TC-6DS (manufactured by Tokyo Denshoku Co.)

(3) Ghost:

A position on the developing sleeve at which a latent image having solid white areas and solid black areas adjoining to one another was developed was so made as to come to a development position at the next round of the developing sleeve to develop a latent halftone image, where shade differences appearing on the developed halftone image were evaluated according to the following criteria.

A: No shade difference is seen at all.

B: Slight shade differences are seen.

C: Shade differences are a little seen, but tolerable in practical use.

D: Shade differences are conspicuous, and intolerable in practical use.

(4) Wear Resistance of the Conductive Coat Layer:

Center-line average roughness (Ra) of the surface of the developer carrying member was measured before and after the running.

(5) Anti-contamination Properties of the Conductive Coat Layer:

The surface of the developer carrying member was observed by SEM after the running, and the degree of toner contamination was evaluated according to the following criteria.

A: A slight contamination is seen.

B: Contamination is a little seen.

C: Contamination is partly seen.

D: Contamination is conspicuous.

(6) Character Line Sharpness:

Characters reproduced on transfer paper in an environment of high temperature and high humidity (32.5° C., 85% RH) were magnified about 30 times, and their sharpness was evaluated according to the following criteria.

A: (Excellent) Lines are very sharp and almost no black spots around line images are seen.

B: (Good) Black spots around line images are only slightly seen, and lines are relatively sharp.

C: (Average) A little many black spots around line images are seen, and lines are blurred.

D: (Poor) Lower than the level of "C".

TABLE 3

| | L/L running density | | | L/L running fog | | | L/L running ghost | | | |
|---|---|---|---|---|---|---|---|---|---|---|
| | Initial stage | 15,000 sheets | 30,000 sheets | Initial stage | 15,000 sheets | 30,000 sheets | Initial stage | 15,000 sheets | 30,000 sheets | Test machine |
| Example: | | | | | | | | | | |
| 1 | 1.47 | 1.44 | 1.41 | 0.8 | 1.3 | 1.7 | A | A | A | LBP450 |
| 2 | 1.44 | 1.37 | 1.35 | 0.9 | 2.0 | 2.5 | A | A | B | LBP450 |
| 3 | 1.48 | 1.38 | 1.32 | 0.8 | 2.1 | 2.8 | A | B | C | LBP450 |
| 4 | 1.46 | 1.41 | 1.35 | 0.9 | 1.6 | 2.5 | A | B | C | LBP450 |
| 5 | 1.45 | 1.41 | 1.36 | 1.2 | 2.3 | 2.9 | A | B | B | LBP450 |
| 6 | 1.45 | 1.42 | 1.37 | 0.9 | 1.5 | 2.3 | A | A | B | LBP450 |
| 7 | 1.46 | 1.37 | 1.30 | 1.0 | 2.1 | 3.0 | A | B | C | LBP450 |
| 8 | 1.45 | 1.38 | 1.29 | 1.1 | 2.2 | 3.0 | A | B | C | LBP450 |
| 9 | 1.45 | 1.42 | 1.38 | 1.0 | 1.4 | 1.8 | A | B | B | LBP450 |
| 10 | 1.47 | 1.41 | 1.37 | 1.1 | 1.9 | 2.6 | A | B | B | LBP450 |
| 11 | 1.46 | 1.38 | 1.36 | 0.9 | 1.8 | 2.4 | A | B | B | LBP450 |
| 12 | 1.46 | 1.43 | 1.40 | 0.8 | 1.2 | 1.8 | A | A | A | LBP450 |
| 13 | 1.45 | 1.43 | 1.39 | 0.8 | 1.5 | 2.0 | A | A | B | LBP450 |
| 14 | 1.46 | 1.34 | 1.25 | 0.9 | 2.6 | 3.3 | A | C | C | LBP450 |
| 15 | 1.43 | 1.35 | 1.26 | 0.8 | 2.6 | 3.3 | A | C | C | LBP450 |
| 17 | 1.43 | 1.36 | 1.32 | 1.0 | 2.3 | 2.7 | A | A | B | LBP450 |
| Comparative Example: | | | | | | | | | | |
| 1 | 1.43 | 1.19 | 0.95 | 1.3 | 3.9 | 4.5 | A | D | D | LBP450 |
| 2 | 1.43 | 1.27 | 1.05 | 1.4 | 2.9 | 3.9 | A | C | D | LBP450 |
| 3 | 1.44 | 1.26 | 1.03 | 1.7 | 3.1 | 4.0 | A | C | D | LBP450 |
| 4 | 1.45 | 1.24 | 1.01 | 1.3 | 3.2 | 4.2 | A | C | D | LBP450 |
| 5 | 1.45 | 1.32 | 1.23 | 0.9 | 2.9 | 3.5 | A | C | C | LBP450 |
| 6 | 1.41 | 1.30 | 1.20 | 1.2 | 3.3 | 3.8 | A | C | D | LBP450 |
| 7 | 1.44 | 1.31 | 1.22 | 1.0 | 3.0 | 3.6 | A | C | C | LBP450 |
| | Initial stage | 250,000 sheets | 500,000 sheets | Initial stage | 250,000 sheets | 500,000 sheets | Initial stage | 250,000 sheets | 500,000 sheets | Test machine |
| Example: | | | | | | | | | | |
| 16 | 1.45 | 1.43 | 1.42 | 0.8 | 1.0 | 1.3 | A | A | A | NP6060 |
| Comparative Example: | | | | | | | | | | |
| 8 | 1.44 | 1.25 | 1.08 | 1.2 | 2.7 | 3.9 | A | C | D | NP6060 |

TABLE 4A

| | H/H running density | | | | | H/H running fog | | | | | |
|---|---|---|---|---|---|---|---|---|---|---|---|
| | Initial stage | 15,000 sheets (*) | | 30,000 sheets (*) | | Initial stage | 15,000 sheets (*) | | 30,000 sheets (*) | | Test machine |
| Example: | | | | | | | | | | | |
| 1 | 1.42 | 1.37 | 1.32 | 1.36 | 1.30 | 0.8 | 1.0 | 1.5 | 1.3 | 1.9 | LBP450 |
| 2 | 1.40 | 1.35 | 1.27 | 1.33 | 1.24 | 0.7 | 1.2 | 2.0 | 1.7 | 2.8 | LBP450 |
| 3 | 1.43 | 1.38 | 1.35 | 1.36 | 1.31 | 0.7 | 1.0 | 1.5 | 1.6 | 2.3 | LBP450 |
| 4 | 1.41 | 1.34 | 1.28 | 1.31 | 1.23 | 0.8 | 1.2 | 2.1 | 1.8 | 2.9 | LBP450 |
| 5 | 1.40 | 1.35 | 1.29 | 1.34 | 1.29 | 0.9 | 1.2 | 1.7 | 1.5 | 2.1 | LBP450 |
| 6 | 1.41 | 1.36 | 1.28 | 1.33 | 1.25 | 0.8 | 1.3 | 1.7 | 1.5 | 2.1 | LBP450 |
| 7 | 1.37 | 1.34 | 1.23 | 1.30 | 1.20 | 0.8 | 1.4 | 2.3 | 1.9 | 2.9 | LBP450 |
| 8 | 1.38 | 1.32 | 1.20 | 1.29 | 1.19 | 1.0 | 1.7 | 2.5 | 2.3 | 3.1 | LBP450 |
| 9 | 1.41 | 1.35 | 1.30 | 1.35 | 1.18 | 0.8 | 1.2 | 1.8 | 1.4 | 2.0 | LBP450 |
| 10 | 1.43 | 1.35 | 1.29 | 1.35 | 1.26 | 0.8 | 1.4 | 1.9 | 1.5 | 2.3 | LBP450 |

TABLE 4A-continued

| | | | | | | | | | | | |
|---|---|---|---|---|---|---|---|---|---|---|---|
| 11 | 1.42 | 1.35 | 1.31 | 1.35 | 1.28 | 0.8 | 1.4 | 1.7 | 1.7 | 2.0 | LBP450 |
| 12 | 1.44 | 1.39 | 1.34 | 1.38 | 1.32 | 0.7 | 1.0 | 1.4 | 1.4 | 1.7 | LBP450 |
| 13 | 1.41 | 1.36 | 1.30 | 1.35 | 1.31 | 0.7 | 1.1 | 1.6 | 1.4 | 2.0 | LBP450 |
| 14 | 1.36 | 1.31 | 1.18 | 1.27 | 1.15 | 1.1 | 1.9 | 2.7 | 2.5 | 3.2 | LBP450 |
| 15 | 1.40 | 1.33 | 1.21 | 1.30 | 1.16 | 0.8 | 1.5 | 2.4 | 2.0 | 3.1 | LBP450 |
| 17 | 1.38 | 1.33 | 1.20 | 1.27 | 1.17 | 0.8 | 1.4 | 2.3 | 2.0 | 3.1 | LBP450 |
| Comparative Example: | | | | | | | | | | | |
| 1 | 1.37 | 1.19 | 1.05 | 1.11 | 0.94 | 1.2 | 2.3 | 3.6 | 3.8 | 4.3 | LBP450 |
| 2 | 1.41 | 1.24 | 1.10 | 1.18 | 0.98 | 0.8 | 1.9 | 3.1 | 2.8 | 3.9 | LBP450 |
| 3 | 1.36 | 1.22 | 1.07 | 1.17 | 0.97 | 1.3 | 2.1 | 3.3 | 3.2 | 4.1 | LBP450 |
| 4 | 1.37 | 1.25 | 1.10 | 1.15 | 1.04 | 0.9 | 1.8 | 3.1 | 3.1 | 3.8 | LBP450 |
| 5 | 1.36 | 1.29 | 1.13 | 1.29 | 1.02 | 1.1 | 1.7 | 3.0 | 2.7 | 3.9 | LBP450 |
| 6 | 1.32 | 1.25 | 1.09 | 1.27 | 0.97 | 1.4 | 1.9 | 3.3 | 2.9 | 4.2 | LBP450 |
| 7 | 1.37 | 1.30 | 1.14 | 1.31 | 1.03 | 1.0 | 1.6 | 3.0 | 2.8 | 4.0 | LBP450 |
| | Initial stage | 250,000 sheets (*) | | 500,000 sheets (*) | | Initial stage | 250,000 sheets (*) | | 500,000 sheets (*) | | Test machine |
| Example: | | | | | | | | | | | |
| 16 | 1.4 | 1.35 | 1.28 | 1.32 | 1.26 | 0.8 | 1.1 | 1.6 | 1.6 | 2.0 | NP6060 |
| Comparative Example: | | | | | | | | | | | |
| 8 | 1.39 | 1.15 | 1.07 | 1.01 | 0.87 | 1.3 | 2.6 | 3.7 | 3.8 | 4.5 | NP6060 |

(*): After 5 day rest

TABLE 4B

| | H/H running ghost | | | | | H/H character line sharpness | | | | | |
|---|---|---|---|---|---|---|---|---|---|---|---|
| | Initial stage | 15,000 sheets (*) | | 30,000 sheets (*) | | Initial stage | 15,000 sheets (*) | | 30,000 sheets (*) | | Test machine |
| Example: | | | | | | | | | | | |
| 1 | A | A | A | A | A | A | A | A | A | B | LBP450 |
| 2 | A | A | A | A | A | B | B | C | B | C | LBP450 |
| 3 | A | A | A | B | B | A | A | A | A | B | LBP450 |
| 4 | A | B | A | B | B | A | A | B | B | C | LBP450 |
| 5 | A | A | A | B | A | B | B | B | B | C | LBP450 |
| 6 | A | A | A | B | A | A | A | B | A | B | LBP450 |
| 7 | A | B | A | C | B | A | B | C | B | C | LBP450 |
| 8 | A | C | B | C | B | B | B | C | B | C | LBP450 |
| 9 | A | A | A | A | A | A | A | B | A | B | LBP450 |
| 10 | A | A | A | A | A | A | A | B | A | B | LBP450 |
| 11 | A | A | A | A | A | A | A | B | A | B | LBP450 |
| 12 | A | A | A | A | A | A | A | A | A | B | LBP450 |
| 13 | A | A | A | A | A | B | B | C | B | C | LBP450 |
| 14 | A | B | A | C | B | A | B | C | B | C | LBP450 |
| 15 | A | C | B | C | C | A | B | C | B | C | LBP450 |
| 17 | A | A | A | B | A | B | B | C | C | C | LBP450 |
| Comparative Example: | | | | | | | | | | | |
| 1 | A | C | C | D | D | B | C | D | D | D | LBP450 |
| 2 | A | B | B | D | C | A | C | D | C | D | LBP450 |
| 3 | A | C | C | D | D | B | C | D | C | D | LBP450 |
| 4 | A | B | B | D | C | B | B | D | C | D | LBP450 |
| 5 | A | B | A | C | B | B | B | D | C | D | LBP450 |
| 6 | A | B | A | C | B | A | C | D | C | D | LBP450 |
| 7 | A | B | A | C | B | B | B | D | C | D | LBP450 |
| | Initial stage | 250,000 sheets (*) | | 500,000 sheets (*) | | Initial stage | 250,000 sheets (*) | | 500,000 sheets (*) | | Test machine |
| Example: | | | | | | | | | | | |
| 16 | A | A | A | A | A | A | A | B | A | B | NP6060 |

TABLE 4B-continued

| | | | | | | | | | | | |
|---|---|---|---|---|---|---|---|---|---|---|---|
| Comparative Example: | | | | | | | | | | | |
| 8 | A | C | C | D | D | A | B | C | C | D | NP6060 |

(*): After 5 day rest

TABLE 5

Evaluation Results (Wear Resistance, Anti-contamination Properties)

| | Developer carrying member | Wear resistance Before running Ra (μm) | After L/L running Ra (μm) | After H/H running Ra (μm) | Anti-contamination properties After L/L running | After H/H rung ning | Test machine |
|---|---|---|---|---|---|---|---|
| Example: | | | | | | | |
| 1 | C-1 | 1.53 | 1.46 | 1.42 | A | A | LBP450 |
| 2 | C-2 | 1.41 | 1.36 | 1.32 | A | A | LBP450 |
| 3 | C-3 | 1.59 | 1.53 | 1.49 | A | B | LBP450 |
| 4 | C-4 | 1.23 | 1.14 | 1.08 | A | B | LBP450 |
| 5 | C-5 | 1.68 | 1.59 | 1.51 | A | B | LBP450 |
| 6 | C-6 | 1.56 | 1.43 | 1.39 | B | C | LBP450 |
| 7 | C-7 | 1.58 | 1.49 | 1.40 | B | C | LBP450 |
| 8 | C-8 | 1.54 | 1.41 | 1.36 | C | C | LBP450 |
| 9 | C-9 | 1.57 | 1.51 | 1.44 | A | B | LBP450 |
| 10 | C-10 | 1.45 | 1.40 | 1.37 | A | A | LBP450 |
| 11 | C-11 | 1.42 | 1.37 | 1.32 | A | A | LBP450 |
| 12 | C-12 | 1.50 | 1.43 | 1.40 | A | A | LBP450 |
| 13 | C-13 | 1.46 | 1.40 | 1.35 | A | A | LBP450 |
| 14 | C-14 | 1.53 | 1.45 | 1.40 | A | B | LBP450 |
| 15 | C-15 | 1.20 | 1.07 | 1.05 | C | C | LBP450 |
| 17 | C-17 | 1.38 | 1.30 | 1.25 | A | B | LBP450 |
| Comparative Example: | | | | | | | |
| 1 | D-1 | 1.65 | 0.93 | 0.85 | D | D | LBP450 |
| 2 | D-2 | 1.55 | 1.18 | 1.07 | C | D | LBP450 |
| 3 | D-3 | 1.60 | 1.10 | 1.01 | C | D | LBP450 |
| 4 | D-4 | 1.68 | 1.32 | 1.20 | C | D | LBP450 |
| 5 | D-5 | 1.43 | 1.37 | 1.33 | A | B | LBP450 |
| 6 | D-6 | 1.41 | 1.34 | 1.30 | A | B | LBP450 |
| 7 | D-7 | 1.56 | 1.48 | 1.43 | A | B | LBP450 |
| Example: | | | | | | | |
| 16 | C-16 | 0.95 | 0.90 | 0.89 | A | A | NP6060 |
| Comparative Example: | | | | | | | |
| 8 | D-8 | 0.93 | 0.67 | 0.64 | C | D | NP6060 |

What is claimed is:

1. A developer carrying member comprising a substrate and a coat layer which covers the surface of the substrate, wherein;

said coat layer contains at least a binder resin, conductive spherical particles having a number average particle diameter of from 0.3 μm to 30 μm and a true density of 3 g/cm$^3$ or below, and a particulate nitrogen-containing heterocyclic compound; said particles and said compound being dispersed in said binder resin.

2. The developer carrying member according to claim 1, wherein said conductive spherical particles have a number average particle diameter of from 2 μm to 20 μm.

3. The developer carrying member according to claim 1, wherein said conductive spherical particles have a true density of 2.7 g/cm$^3$ or below.

4. The developer carrying member according to claim 1, wherein said conductive spherical particles have a true density of from 0.9 g/cm$^3$ to 2.7 g/cm$^3$.

5. The developer carrying member according to claim 1, wherein said conductive spherical particles have a volume resistivity of $10^6$ Ω·cm or below.

6. The developer carrying member according to claim 1, wherein said conductive spherical particles are produced by coating the surfaces of spherical particles with bulk-mesophase pitch, and heat-treating the coated particles in an oxidative atmosphere or in vacuo, followed by firing in an inert atmosphere or in vacuo, thereby carbonizing the interior of the particles and graphitizing the exterior of the particles.

7. The developer carrying member according to claim 6, wherein said conductive spherical particles are plated with a conductive metal or a conductive metal oxide, or both of them.

8. The developer carrying member according to claim 1, wherein said conductive spherical particles comprise spherical particles whose surfaces have been subjected to conductivity treatment by forming thereon a coating of conductive fine particles.

9. The developer carrying member according to claim 1, wherein said conductive spherical particles comprise spherical resin particles with conductive fine particles dispersed therein.

10. The developer carrying member according to claim 1, wherein said nitrogen-containing heterocyclic compound has a number average particle diameter of 20 μm or smaller.

11. The developer carrying member according to claim 1, wherein said nitrogen-containing heterocyclic compound has a number average particle diameter of from 0.1 μm to 15 μm.

12. The developer carrying member according to claim 1, wherein said nitrogen-containing heterocyclic compound comprises a compound selected from the group consisting of imidazole, imidazoline, imidazolone, pyrazoline, pyrazole, pyrazolone, oxazoline, oxazole, oxazolone, thiazoline, thiazole, thiazolone, selenazoline, selenazole, selenazolone, oxadiazole, thiadiazole, tetrazole, benzoimidazole, benzotriazole, benzoxazole, benzothiazole, benzoselenazole, pyrazine, pyrimidine, pyridazine, triazine, oxazine, thiazine, tetrazine, polyazaine, pyridazine, pyrimidine, pyrazine, indole, isoindole, indazole, carbazole, quinoline, pyridine, isoquinoline, cinnoline, quinazoline, quinoxaline, phthalazine, purine, pyrrole, triazole and phenazine.

13. The developer carrying member according to claim 1, wherein said nitrogen-containing heterocyclic compound comprises an imidazole compound.

14. The developer carrying member according to claim 1, wherein said nitrogen-containing heterocyclic compound is a compound represented by the following formula (1) or (2):

(1)

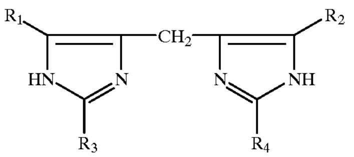

wherein $R_1$ and $R_2$ are each independently a hydrogen atom, an alkyl group, an aralkyl group or an aryl group, and $R_3$ and $R_4$ are each independently a straight-chain alkyl group containing 3 to 30 carbon atoms;

(2)

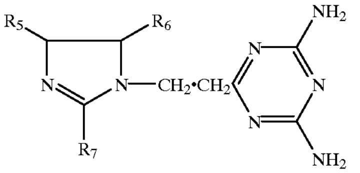

wherein $R_5$ and $R_6$ are each independently a hydrogen atom, an alkyl group, an aralkyl group or an aryl group, and $R_7$ is a straight-chain alkyl group containing 3 to 30 carbon atoms.

15. The developer carrying member according to claim 1, wherein said coat layer further contains lubricating particles in addition to said conductive spherical particles and nitrogen-containing heterocyclic compound.

16. The developer carrying member according to claim 15, wherein said lubricating particles comprise particles of a material selected from the group consisting of graphite, molybdenum disulfide, boron nitride, mica, graphite fluoride, silver-niobium selenide, calcium chloride-graphite, talc and a fatty acid metal salt.

17. The developer carrying member according to claim 15, wherein said lubricating particles have a number average particle diameter of from 0.2 $\mu$m to 20 $\mu$m.

18. The developer carrying member according to claim 1, wherein said binder resin is a thermoplastic resin selected from the group consisting of a styrene resin, a vinyl resin, polyether sulfone resin, polycarbonate resin, polyphenylene oxide resin, a polyamide resin, a fluorine resin, a cellulose resin and an acrylic resin.

19. The developer carrying member according to claim 15, wherein said lubricating particles are contained in the coat layer in an amount of from 5 parts by weight to 120 parts by weight based on 100 parts by weight of said binder resin.

20. The developer carrying member according to claim 15, wherein said lubricating particles is contained in the coat layer in an amount of from 10 parts by weight to 100 parts by weight based on 100 parts by weight of said binder resin.

21. The developer carrying member according to claim 1, wherein said binder resin is a photocurable resin selected from the group consisting of an epoxy resin, a polyester resin, an alkyd resin, a phenol resin, a melamine resin, a polyurethane resin, a urea resin, a silicone resin and a polyimide resin.

22. The developer carrying member according to claim 1, wherein said binder resin is a silicone resin or a fluorine resin.

23. The developer carrying member according to claim 1, wherein said binder resin is a resin selected from the group consisting of polyether sulfone, polycarbonate, polyphenylene oxide, polyamide, phenol, polyester, polyurethane, a styrene resin and an acrylic resin.

24. The developer carrying member according to claim 1, wherein said coat layer has a volume resistivity of $10^3$ $\Omega$·cm or below.

25. The developer carrying member according to claim 1, wherein said coat layer has a volume resistivity of from $10^{-2}$ $\Omega$·cm to $10^3$ $\Omega$·cm.

26. The developer carrying member according to claim 1, wherein said coat layer further contains conductive fine particles in addition to said conductive spherical particles and nitrogen-containing heterocyclic compound.

27. The developer carrying member according to claim 26, wherein said conductive fine particles comprise particles of a member selected from the group consisting of carbon black, a metal oxide, a conductive metal, graphite, metal fiber and carbon fiber.

28. The developer carrying member according to claim 26, wherein said conductive fine particles are contained in the coat layer in an amount not more than 40 parts by weight based on 100 parts by weight of said binder resin.

29. The developer carrying member according to claim 26, wherein said conductive fine particles are contained in the coat layer in an amount of from 2 parts by weight to 30 parts by weight based on 100 parts by weight of said binder resin.

30. The developer carrying member according to claim 1, wherein said conductive spherical particles are contained in the coat layer in an amount of from 2 parts by weight to 120 parts by weight based on 100 parts by weight of the binder resin.

31. The developer carrying member according to claim 1, wherein said conductive spherical particles are contained in the coat layer in an amount of from 2 parts by weight to 80 parts by weight based on 100 parts by weight of the binder resin.

32. The developer carrying member according to claim 1, wherein said nitrogen-containing heterocyclic compound is contained in the coat layer in an amount of from 0.5 part by weight to 60 parts by weight based on 100 parts by weight of the binder resin.

33. The developer carrying member according to claim 1, wherein said nitrogen-containing heterocyclic compound is contained in the coat layer in an amount of from 1 part by weight to 50 parts by weight based on 100 parts by weight of the binder resin.

34. The developer carrying member according to claim 1, wherein the weight ratio of the conductive particle content to the nitrogen-containing heterocyclic compound content in said coat layer satisfies the following requirement:

the conductive spherical particle content : the nitrogen-containing compound content=1:0.4 to 5.0.

35. The developer carrying member according to claim 1, wherein the weight ratio of the conductive particle content to the nitrogen-containing heterocyclic compound content in said coat layer satisfies the following requirement:

the conductive spherical particle content: the nitrogen-containing compound content=1:0.7 to 4.5.

36. The developer carrying member according to claim 1, wherein the weight ratio of the conductive particle content to the nitrogen-containing heterocyclic compound content in said coat layer satisfies the following requirement:

the conductive spherical particle content: the nitrogen-containing compound content=1:1.2 to 4.0.

37. A developing apparatus comprising:

a developer container holding a developer; and a developer carrying member for carrying the developer held in the developer container and transporting the developer to a developing zone;

wherein said developer carrying member comprises a substrate, and a coat layer which covers the surface of the substrate;

said coat layer containing at least a binder resin, conductive spherical particles having a number average particle diameter of from 0.3 μm to 30 μm and a true density of 3 $g/cm^3$ or below, and a particulate nitrogen-containing heterocyclic compound; said particles and said compound being dispersed in said binder resin;

wherein said developer carrying member is one according to any one of claims 5 and 6–36.

38. A developing method comprising the steps of:

allowing a developer carrying member to carry a developer held in a developer container so that a developer layer is formed on the surface of the developer carrying member;

transporting the developer carried on the developer carrying member to a developing zone at which the developer carrying member and an electrostatic latent image bearing member face each other; and developing an electrostatic latent image held on the electrostatic latent image bearing member with the developer carried on the developer carrying member;

wherein said developer carrying member comprises a substrate, and a coat layer which covers the surface of the substrate;

said coat layer containing at least a binder resin, conductive spherical particles having a number average particle diameter from 0.3 μm to 30 μm and a true density of 3 $g/cm^3$ or below, and a particulate nitrogen-containing heterocyclic compound; said particles and said compound being dispersed in said binder resin;

wherein said developer carrying member is one according to any one of claims 5 and 6–36.

39. An image forming apparatus comprising:

an electrostatic latent image bearing member for bearing an electrostatic latent image, and a developing apparatus for developing the electrostatic latent image to form a developed image;

said developing apparatus comprising;

a developer container holding a developer; and a developer carrying member for carrying the developer held in the developer container and transporting the developer to a developing zone;

wherein said developer carrying member comprises a substrate, and a coat layer which covers the surface of the substrate;

said coat layer containing at least a binder resin, conductive spherical particles having a number average particle diameter of from 0.3 μm to 30 μm and a true density of 3 $g/cm^3$ or below, and a particulate nitrogen-containing heterocyclic compound; said particles and said compound being dispersed in said binder resin; wherein said developer carrying member is one according to any one of claims 5 and 6–36.

40. A process cartridge detachably mountable to a main assembly of an image forming apparatus, comprising:

an electrostatic latent image bearing member for bearing an electrostatic latent image, and a developing means for developing the electrostatic latent image;

said developing means comprising;

a developer container holding a developer; and a developer carrying member for carrying the developer held in the developer container and transporting the developer to the developing zone;

wherein said developer carrying member comprises a substrate, and a coat layer which covers the surface of the substrate;

said coat layer containing at least a binder resin, conductive spherical particles having a number average particle diameter of from 0.3 μm to 30 μm and a true density of 3 $g/cm^3$ or below, and a particulate nitrogen-containing heterocyclic compound; said particles and said compound being dispersed in said binder resin; wherein said developer carrying member is the developer carrying member according to any one of claims 5 and 6–36.

41. A developing apparatus comprising:

a developer container holding a developer; and a developer carrying member for carrying the developer held in the developer container and transporting the developer to a developing zone;

wherein said developer carrying member comprises a substrate, and a coat layer which covers the surface of the substrate;

said coat layer containing at least a binder resin, conductive spherical particles having a number average particle diameter of from 0.3 μm to 30 μm and a true density of 3 $g/cm^3$ or below, and a particulate nitrogen-containing heterocyclic compound; said particles and said compound being dispersed in said binder resin.

42. The developing apparatus according to claim 41, which has a power source having a means for generating a vibrating electric field at the developing zone.

43. The developing apparatus according to claim 42, which has a power source for applying an alternating bias voltage to said developer carrying member.

44. The developing apparatus according to claim 41, wherein the thickness of a developer layer formed on the surface of said developer carrying member is smaller than the minimum gap between an electrostatic latent image bearing member and said developer carrying member which form the developing zone.

45. The developing apparatus according to claim 41, which has a power source having a means for generating a vibrating electric field at the developing zone, and wherein the thickness of a developer layer formed on the surface of said developer carrying member is smaller than the minimum gap between an electrostatic latent image bearing member and said developer carrying member which form the developing zone.

46. A developing method comprising the steps of;

allowing a developer carrying member to carry a developer held in a developer container so that a developer layer is formed on the surface of the developer carrying member;

transporting the developer carried on the developer carrying member to a developing zone at which the developer carrying member and an electrostatic latent image bearing member face each other; and developing an electrostatic latent image held on the electrostatic latent image bearing member with the developer carried on the developer carrying member;

wherein said developer carrying member comprises a substrate, and a coat layer which covers the surface of the substrate;

said coat layer containing at least a binder resin, conductive spherical particles having a number average particulate particle diameter of from 0.3 μm to 30 μm and a true density of 3 $g/cm^3$ or below, and a nitrogen-containing heterocyclic compound; said particles and said compound being dispersed in said binder resin.

47. The developing method according to claim 46, wherein a power source having a means for generating a vibrating electric field at the developing zone is present.

48. The developing method according to claim 47, wherein a power source for applying an alternating bias voltage to said developer carrying member is present.

49. The developing method according to claim 46, wherein the thickness of the developer layer formed on the surface of said developer carrying member is smaller than the minimum gap between an electrostatic latent image bearing member and said developer carrying member which form the developing zone.

50. The developing method according to claim 46, wherein a power source having a means for generating a vibrating electric field at the developing zone is present, and wherein the thickness of the developer layer formed on the surface of said developer carrying member is smaller than the minimum gap between an electrostatic latent image bearing member and said developer carrying member which form the developing zone.

51. An image forming apparatus comprising:

an electrostatic latent image bearing member for bearing an electrostatic latent image, and a developing apparatus for developing the electrostatic latent image to form a developed image;

said developing apparatus comprising;

a developer container holding a developer; and a developer carrying member for carrying the developer held in the developer container and transporting the developer to a developing zone;

wherein said developer carrying member comprises a substrate, and a coat layer which covers the surface of the substrate;

said coat layer containing at least a binder resin, conductive spherical particles having a number average particle diameter of from 0.3 $\mu m$ to 30 $\mu m$ and a true density of 3 $g/cm^3$ or below, and a particulate nitrogen-containing heterocyclic compound; said particles and said compound being dispersed in said binder resin.

52. The image forming apparatus according to claim 51, wherein said electrostatic latent image bearing member is an electrophotographic photosensitive member.

53. The image forming apparatus according to claim 51, which has a power source having a means for generating a vibrating electric field at the developing zone.

54. The image forming apparatus according to claim 53, which has a power source for applying an alternating bias voltage to said developer carrying member.

55. The image forming apparatus according to claim 51, wherein a thickness of a developer layer formed on the surface of said developer carrying member is smaller than the minimum gap between an electrostatic latent image bearing member and said developer carrying member which form the developing zone.

56. The image forming apparatus according to claim 51, which has a power source having a means for generating a vibrating electric field at the developing zone, and wherein the thickness of a developer layer formed on the surface of said developer carrying member is smaller than the minimum gap between an electrostatic latent image bearing member and said developer carrying member which form the developing zone.

57. A process cartridge detachably mountable to a main assembly of an image forming apparatus, comprising:

an electrostatic latent image bearing member for bearing an electrostatic latent image, and a developing means for developing the electrostatic latent image;

said developing means comprising;

a developer container holding a developer; and a developer carrying member for carrying the developer held in the developer container and transporting the developer to the developing zone; wherein said developer carrying member comprises a substrate, and a coat layer which covers the surface of the substrate;

said coat layer containing at least a binder resin, conductive spherical particles having a number average particle diameter of from 0.3 $\mu m$ to 30 $\mu m$ and a true density of 3 $g/cm^3$ or below, and a particulate nitrogen-containing heterocyclic compound; said particles and said compound being dispersed in said binder resin.

58. The process cartridge according to claim 57, wherein said electrostatic latent image bearing member is an electrophotographic photosensitive member.

59. The process cartridge according to claim 57, which further comprises a cleaning means for cleaning the surface of said electrostatic latent image bearing member; said cleaning means being joined into one unit in addition to said electrostatic latent image bearing member and said developing means.

60. The process cartridge according to claim 59, wherein said cleaning means is a cleaning blade.

61. The process cartridge according to claim 57, which further comprises a charging means for primarily charging the surface of said electrostatic latent image bearing member; said charging means being joined into one unit in addition to said electrostatic latent image bearing member and said developing means.

62. The process cartridge according to claim 57, which further comprises a cleaning means for cleaning the surface of said electrostatic latent image bearing member and said charging means for primarily charging the surface, of said electrostatic latent image bearing member; said cleaning means and said charging means being joined into one unit in addition to said electrostatic latent image bearing member and said developing means.

63. The process cartridge according to claim 57, wherein a thickness of a developer layer formed on the surface of said developer carrying member is smaller than a minimum gap between an electrostatic latent image bearing member and said developer carrying member which form said developing zone.

* * * * *

UNITED STATES PATENT AND TRADEMARK OFFICE

CERTIFICATE OF CORRECTION

PATENT NO. : 5,998,008
DATED : December 7, 1999
INVENTOR(S) : SHIMAMURA ET AL.

It is certified that error appears in the above-identified patent and that said Letters Patent is hereby corrected as shown below:

COLUMN 2

Line 40, "satisfactory," should read --resolved,--.

COLUMN 4

Line 7, "below;," should read --below,--.

COLUMN 6

Line 35, "lower," should read --be lower,--.

COLUMN 7

Line 7, "move" should read --further--.

COLUMN 13

Line 39, "back ground" should read --background--.

COLUMN 22

Line 32, "subsequent:" should read --subsequent--.

UNITED STATES PATENT AND TRADEMARK OFFICE

CERTIFICATE OF CORRECTION

PATENT NO. : 5,998,008

DATED : December 7, 1999

INVENTOR(S) : SHIMAMURA ET AL.

It is certified that error appears in the above-identified patent and that said Letters Patent is hereby corrected as shown below:

COLUMN 22

Line 48, "7.5 μpm," should read --7.5 μm,--.

COLUMN 25

Line 29, "thali" should read --that--.

COLUMN 29

Line 37, "repeated" should read --repeated to produce a--.

COLUMN 38

Line 25, "claim 6," should read --claim 1,--; and
Line 56, "polyazaine," should read --polyazine,--.

COLUMN 39

Line 53, "is" should read --are--.

COLUMN 41

Line 12, "claims 5 and 6-36." should read --claims 5-36.--;
Line 35, "claims 5 and 6-36." should read --claims 5-36.--; and
Line 57, "claims 5 and 6-36." should read --claims 5-36.--.

UNITED STATES PATENT AND TRADEMARK OFFICE

CERTIFICATE OF CORRECTION

PATENT NO. : 5,998,008

DATED : December 7, 1999

INVENTOR(S) : SHIMAMURA ET AL.

It is certified that error appears in the above-identified patent and that said Letters Patent is hereby corrected as shown below:

COLUMN 42

Line 11, "claims 5 and 6-36." should read --claims 5-36.--; and
Line 65, "nitrogen-" should read --particulate nitrogen- --.

Signed and Sealed this

Twenty-seventh Day of February, 2001

Attest:

NICHOLAS P. GODICI

Attesting Officer

*Acting Director of the United States Patent and Trademark Office*